US00RE39647E

(19) United States
(12) Reissued Patent
Okubo et al.

(10) Patent Number: US RE39,647 E
(45) Date of Reissued Patent: May 22, 2007

(54) DISK FOR TOROIDAL TYPE CONTINUOUSLY VARIABLE TRANSMISSION

(75) Inventors: Kiyoshi Okubo, Maebashi (JP); Akira Tsubouchi, Maebashi (JP); Takashi Imanishi, Fujisawa (JP); Nobuo Gotou, Fujisawa (JP)

(73) Assignee: NSK Ltd., Tokyo (JP)

(21) Appl. No.: 10/233,481

(22) Filed: Sep. 4, 2002

Related U.S. Patent Documents

Reissue of:
(64) Patent No.: 6,113,514
Issued: Sep. 5, 2000
Appl. No.: 09/220,763
Filed: Dec. 28, 1998

(30) Foreign Application Priority Data

Dec. 26, 1997 (JP) ..... 9-361151

(51) Int. Cl.
*F16H 15/38* (2006.01)
*B21D 22/06* (2006.01)

(52) U.S. Cl. ..... 476/40; 29/893.34; 72/360; 476/73

(58) Field of Classification Search ..... 476/40, 476/42, 73; 29/893.34; 72/360
See application file for complete search history.

(56) References Cited

U.S. PATENT DOCUMENTS

| | | | | | |
|---|---|---|---|---|---|
| 4,324,441 | A | | 4/1982 | Rouverol et al. | 384/492 |
| 4,798,077 | A | | 1/1989 | Douglas | 72/360 |
| 4,856,167 | A | | 8/1989 | Sabroff et al. | 29/893.34 |
| 5,556,348 | A | * | 9/1996 | Kokubu et al. | 476/40 |
| 5,735,769 | A | * | 4/1998 | Takemura et al. | 476/40 |
| 5,976,053 | A | * | 11/1999 | Kino et al. | 476/73 |

* cited by examiner

*Primary Examiner*—William C. Joyce
(74) *Attorney, Agent, or Firm*—Sughrue Mion, PLLC

(57) ABSTRACT

The disk has a traction surface having a concave-arc-shaped cross section which is interposed between a small diameter end portion and a large diameter end portion. In the central portion of the end face of the disk on the small diameter end portion side, there is formed a through hole which extends through the disk up to the large diameter end portion side end face of the disk, while the inner peripheral surface of the through hole is used as an inside diameter surface of the disk. Here, when, among metal flows existing in the disk, a metal flow, which has such a positional relationship with respect to the surface of the disk that an angle θ formed between a metal flow on the traction surface side and the tangent of the traction surface is smaller than or equal to 30 degrees, is defined as a "metal flow along the disk surface", the disk is structured such that the "metal flow along the disk surface" exists at least in the traction surface.

18 Claims, 15 Drawing Sheets

DISK FOR TOROIDAL TYPE CONTINUOUSLY VARIABLE TRANSMISSION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a disk for use in a toroidal type continuously variable transmission which can be used in vehicles, various kinds of industrial machines, and the like.

2. Description of the Related Art

A toroidal type continuously variable transmission comprises, for example, as shown in FIG. 15, input and output disks a and b which are disposed concentrically with each other, and a power roller c which is interposed between the respective traction surfaces f and i of the input and output disks a and b1.

In the input disk a, between the small diameter end portion d and large diameter portion e thereof, there is formed a traction surface f the cross section of which provides a concave-arc shape and, in the output disk b1, similarly, between the small diameter end portion g and large diameter portion h thereof, there is formed a traction surface i the cross section of which provides a concave-arc shape. On the side of the input disk a that is distant from the power roller c, there is concentrically disposed a loading cam through a plurality of engaging rollers (both of which are not shown), so that, due to the oil pressure that is supplied between the loading cam and input disk a, a driving force proportional to a torque can be applied toward the input disk a.

The power roller c is a device which can be frictionally engaged with the respective traction surfaces f and i of the input and output disks a and b1 to thereby transmit power; and, the power roller c is supported by a trunnion j in such a manner that it can be inclined in the diameter direction of the input and output disks a and b1. And, if the trunnion j is operated by a drive mechanism (not shown) to thereby change the contact positions of the power roller c in the diameter direction thereof with respect to the input and output disks a and b1, then a rotation speed ratio between the input and output disks a and b1, that is, a speed change ratio can be varied continuously.

By the way, the toroidal type continuously variable transmission is required to transmit a higher torque and, for this reason, the input and output disks, a, b1 and power roller c receive very large repeated bending stress and repeated shearing stress when compared with ordinary mechanical parts (such as ordinary gears and bearings); and, in the input and output disks a and b1, especially, as shown by fine hatchings in FIG. 17, the traction surfaces f, i, small diameter end portions d, g, and inside diameter surfaces at the small diameter end portion side d (g) receive large repeated bending stress and repeated shearing stress. Therefore, when manufacturing the input and output disks a and b1, it is necessary to use such highly durable material that can resist such repeated bending stress and repeated shearing stress.

Conventionally, to manufacture the input and output disks a and b1, for example, as shown in FIG. 12, cylindrical-shaped material (carburized steel or the like) having a length equal to the axial length of the input and output disks a and b1 is shaved or cut to thereby produce such a final shape as shown in FIG. 16.

However, in the conventional method for manufacturing the input and output disks a and b1, the yield of the material is poor and it takes long time to cut or shave the material, with the result that the production costs of the input and output disks a and b1 are soaring.

Also, because a metal flow (the flow of structure) k is arranged along the axial direction of the disk, in the traction surfaces f and i with which the power roller c is frictionally engaged with a large pressure, the metal flow k comes to an end and, actually, does not extend along the traction surfaces f and i. As a result of this, not only the material is easy to peel off in the portions of the traction surfaces f and i with which the power roller c is frictionally engaged, but also an impact crack or a fatigue crack is easy to occur in the input and output disks a and b starting at the broken portions of the metal flow k, thereby providing an obstacle to the long lives of the input and output disks a and b1.

SUMMARY OF THE INVENTION

The present invention aims at eliminating the drawbacks found in the disks used in the conventional toroidal type continuously variable transmission. Accordingly, it is an object of the invention to provide a disk for use in a toroidal type continuously variable transmission which not only can reduce the production cost thereof but also can realize a long life.

By the way, in the center of the cylindrical-shaped material and in the neighboring portion of such center (that is, in FIGS. 12 and 16, 0.3 D portions: where, D designates the diameter of the cylindrical-shaped material), nonmetallic inclusions, which have a great influence on the fatigue breaking strength of the disk, are high in density (see FIG. 13) and, therefore, it is desired that the nonmetallic inclusions are not present in the heavy bending stress areas of the disk (for example, the inside diameter surface of the small diameter end portions and the like) and in the areas of the traction surfaces that receive the heaviest shearing stress.

Referring now to the nonmetallic inclusions, it is known that the strength of material with respect to repeated bending stress is greatly influenced by the size of the defect thereof at which the breaking of the material can start. For example, in a book titled "Effects of small defects and nonmetallic inclusions" (Written by Yukitaka Murakami, published by Yokendo Ltd.), there is stated as follows: that is, The fatigue limit of material when repeated bending is applied to the material can be expressed by the following equation;

$$\sigma_w = \frac{K(Hv + 120)}{((\text{area})^{1/2})^{1/6}} \quad (1)$$

where K: 1.43 (when a defect is present on the surface of the material);

K: 1.41 (when a defect is present in such a manner as to be in contact of the material surface)

K: 1.56 (when a defect is present in the interior of the material)

$\Sigma_w$: fatigue limit

Hv: hardness of material (relating to the strength of the matrix of the material), and, $(\text{area})^{1/2}$: a square root of a projection area obtained when a defect or a crack is projected in the greatest main stress direction (an amount representing the dimension of a defect or a crack).

Therefore, for a mechanical part which is used under severe conditions such as the toroidal type continuously variable transmission (that is, under such severe conditions, the mechanical part receives not only great repeated bending stress but also great repeated shearing stress), it is desirable to use material in which a defect providing a starting point of the breaking of the material has been controlled.

Generally, it is known that the main defect cause of steel requiring high strength is an oxide-related nonmetallic inclusions. As a method for controlling such oxide-related nonmetallic inclusions, there are known the JIS method (JIS-G-0555), the ASTM method (ASTM-E45) and the like. Also, for bearing material requiring especially high cleanliness, there are known a method which, for example, as disclosed in Japanese Patent Publication No. Hei. 3-294435, melts material again using an electron beam melting method to float large-sized oxide-related nonmetallic inclusions of the material to thereby control the cleanliness of the material, and an extreme statistical method disclosed in the above-cited book "Effects of small defects and nonmetallic inclusions" (Written by Yukitaka Murakami, published by Yokendo Ltd.) (that is, a method in which the greatest diameter of oxide-related nonmetallic inclusions per unit area $S_0$ is investigated from several test pieces and, after then, the thus investigated result is processed statistically, thereby predicting the greatest diameter of oxide-related nonmetallic inclusions in an area S required).

For a ball-and-roller bearing, a gear and the like, using the above-mentioned cleanliness controlling methods, the steel cleanliness is controlled so that they are able to perform their expected functions. However, in the disks and power roller which constitute the toroidal type continuously variable transmission, the absolute values of the stress applied thereto (in particular, the contact surface pressure thereof is of the order of 4.0 GPa and the bending stress thereof is 90 kgf/mm$^2$) are large when compared with the ball-and-roller bearing, a gear and the like to which normal repeated stress is applied. Besides, not only the repeated bending stress and repeated shearing stress are applied simultaneously to the disks and power roller but also the volume thereof receiving such stress is large. For these reasons, in the toroidal type continuously variable transmission, it is difficult to obtain sufficient strength using the above-mentioned nonmetallic inclusions control method. That is, there is desired new means which can cope with the influence of the nonmetallic inclusions.

In attaining the above object, according to the invention, there is provided a disk for use in a toroidal type continuously variable transmission which comprises input and output disks each including a traction surface of a concave-arc-shaped cross section interposed between a small diameter end portion and a large diameter end portion and disposed concentrically with each other with their respective traction surfaces opposed to each other, and a power roller frictionally engageable with the respective traction surfaces of the input and output disks to thereby transmit power. The disk is used as one of the input disk and the output disk, and has metal flows. Under the finished state of the disk after all necessary finishing operations are executed, the metal flows of the disk which has the following positional relationship with respect to the surface of the disk is defined as "metal flows along the disk surface", that is, an angle θ formed between the metal flow on the surface side and the tangent of the surface is smaller than or equal to 30 degrees, preferably, smaller than or equal to 20 degrees. The disk is structured such that the metal flows along the disk surface exist along a part of all surfaces including the traction surface.

Here, when the angle θ of a metal flow with respect to the tangent of the surface of the disk, especially, the traction surface exceeds 30 degrees, then the metal flow becomes equivalent to an end flow (that is, a metal flow which does not extend along the disk surface), which not only causes the material to peel off but also incurs the bending fatigue thereof or the like to thereby cause the disk to break (that is, the crack life of the disk is shortened).

Also, although it is desirable that the lower limit value of the angle θ may be infinitely approximate to 0, (θ=0), as can be seen from the relationship between a state of the material after forged (shown by a two-dot chained line) and a state of the material after completion of working (shown by a solid line) in FIGS. 5 and 9, for example, in the case of the traction surface 4 and inside diameter surface 2, the margin between them varies, with the result that the angles of metal flows 6 intersecting with the traction surface 4 and inside diameter 2 after worked vary from the angles thereof after forged. For example, if a special attention is paid to one metal flow 6 after forged, then it is clear that it does not intersect with above-mentioned respective surfaces at a constant angle but the intersecting angles of the present metal flow 6 is changed between a state of the material after forged and a state of the material after completion of working. And, the intersecting angle θ of the metal flow with respect to the respective surfaces used in the present application, that is, the angle θ of the metal flow having an influence on the peel-off and bending fatigue of the material is defined that it does not mean the state of the material after forged but means the state of the material after worked, namely, the practically usable state of the material.

Therefore, it may be sufficient that the metal flow 6 after forged shows a state which, when the working is completed, is believed to be able to provide the range of the angle θ defined in the present application by means of a given margin. However, although a product having the angle θ equal to 0 or infinitely approximate to 0 is the most desirable from the viewpoint of the performance of the disk, it is also desirable to reduce the margin as much as possible. Also, in order to avoid the variations in the margin, or in order to remove the margin at right angles or at other angles with respect to the surfaces, that is, due to the working need, if the angle θ is obtained extremely severely, then poor working or similar inconveniences can occur, that is, the yield of the products can be degraded, with the result that the manufacturing cost of the disk is caused to rise.

Since the present invention has an object to provide a disk which not only can improve the performance thereof but also can reduce the manufacturing cost thereof and a method for manufacturing the same disk, there is employed θ=2–30 degrees, preferably, θ=5–20 degrees. In particular, the lower limit of the angle θ is defined mainly from the viewpoint of the improvement in both of the performance and yield, whereas the lower limit thereof is defined, as described above, mainly from the viewpoint of the improvements in the peel-off and bending fatigue.

The foregoing description is the definition of the metal flow existing along the disk surface.

(i) Also, the "metal flow along the disk surface", preferably, may exist not only on the above-mentioned traction surface but also on the portion of the inside diameter surface of the disk that extends axially from the small diameter end face of the disk at least in the range of ⅓ A where the length of the disk in the axial direction thereof is expressed as A.

In this manner, the "metal flow along the disk surface" is formed in such a manner as to exist also on the inside diameter surface of the disk axially from the small diameter end face of the disk at least in the range of ⅓ A. The reason for this is as follows: that is, since a peripheral groove for a snap ring as shown in FIG. 17 and the like are formed in the inside diameter surface, the inside diameter surface is a portion which can be affected severely by the bending stress or the like; and, therefore, up to the area of ⅓ A of the disk, it is necessary to dispose the metal flow along the disk surface in the range of θ angle according to the invention.

(ii) In this case, if the "metal flow existing along the disk surface" is formed in such a manner as to exist also in the end face of the disk on the small diameter end portion side thereof, then the bending fatigue and the concentration of the stress applied to the peripheral groove can be relieved, thereby being able to extend the life of the disk still further.

(iii) Further, referring to FIG. 14, preferably, the "metal flow existing along the disk surface" may exist along the traction surface in the peripheral direction thereof in the range of an angle α of 45 degrees or more, preferably, 48 degrees or more, where the angle α is an angle which is formed by the traction surface with respect to a horizontal line (a line extending in parallel to the axis of the disk) passing through the center of radius O.

In this case, the area that receives the severest bending stress and the like in the traction surface (see the fine hatching portions shown in FIG. 17) can be covered by the "metal flow existing along the disk surface", which makes it possible to prevent the breakage of the disk caused by the bending stress and the like.

(iv) Further, the toroidal type continuously variable transmission disk according to the invention is manufactured by forging (which will be described later) using a mold. In this case, referring to FIGS. 10 and 15, where the small radius of a contact ellipse between the traction surface and power roller is expressed as b when the power roller is set horizontal (that is, parallel to the axis of the disk), that is, when a speed change ratio is 1:1, preferably, nonmetallic inclusions having a high density may exist in an area which is distant by 1.5 b or longer in the depth direction from the traction surface. Hereupon, "high density" is defined by the number of nonmetallic inclusions of 10 μm or larger as shown in FIG. 13. "High density area" is such an area of 0.3 D portion in FIG. 13.

The reason for the above is as follows: that is, the area that receives the severest shearing stress in the traction surface is an area which exists within 1.5 b in the depth direction from the traction surface and, therefore, if no nonmetallic inclusions are present in this area, then the life of the disk cannot be influenced at all (see FIG. 11).

(v) Also, as described above, since the portion of the inside diameter surface that extends axially in the range of ⅓ A from the end face on the small diameter end portion side is a portion which can be affected severely by the bending stress or the like due to the formation of the peripheral groove for the snap ring and the like, preferably, no nonmetallic inclusions may be present in ⅓ A range portion of the present inside diameter surface.

By the way, FIGS. 18A to 18D and 19A to 19D respectively show methods respectively for manufacturing a disk for a toroidal type continuously variable transmission, which are disclosed in Japanese Patent Publication No. Hei. 9-126289. These disk manufacturing methods can be used to manufacture only the disk that includes a metal flow of θ=0 degree among the disks according to the present invention, but they are not able to manufacture the remaining disks including metal flows of other angles than θ=0 degree. In brief, in the above-disclosed manufacturing methods, there are found some problems to be solved.

In particular, referring at first to the conventional disk manufacturing method shown in FIGS. 18A to 18D, cylindrical-shaped material (carburized steel or the like) n with its metal flows m extending on the outer peripheral surface of the material along the axial direction thereof is concentrically held by and between an upper mold o and a lower mold p, and the material n is then molded by a given amount (see FIG. 18B). Here, the upper mold o includes a small diameter end portion molding surface s for molding the small diameter end portion r of a disk q and a traction surface molding surface u for molding the traction surface t having a concave-arc-shaped cross section of the disk q, whereas the lower mold p includes a large diameter end portion molding surface w for molding the large diameter end portion v of the disk q. And, the upper mold o and lower mold p are moved further closely to each other to thereby pressure forge the material n in the axial direction thereof several times, so that not only the small diameter end portion r and large diameter end portion v are respectively molded in the upper and lower end portions of the material n respectively, but also the traction surface t is molded between the small diameter end portion r and large diameter end portion v.

Next, as shown in FIG. 18C, the upper mold o and lower mold p are moved most closely to each other to thereby pressure forge the material n into the final shape of the disk q and, after then, not only the thus forged and molded final shape is ground or finished but also the inside diameter surface portion thereof is cut to thereby produce the inside diameter surface x of the disk q1, thereby completing the final product of the disk q1 that is shown in FIG. 18D.

However, in the present conventional manufacturing method, since the cylindrical-shaped material n is forged up to the final shape of the disk q1 using one kind of upper and lower molds o and p, the contact time between the upper and lower molds o, p and the material n is long, which makes it easy for the upper and lower molds o and p to be influenced by heat which is generated in the molding or forging operation. As a result of this, there is raised an inconvenience that the surface hardness of the upper and lower molds o and p can be lowered and the lives of the upper and lower molds o and p can be thereby shortened.

Also, in the final stage of the above molding operation, because the space between the upper and lower molds o and p is filled with the material n in a tightly closed state, the thicknesses of the corner portions of the upper and lower molds o and p can be easily reduced or burrs are easy to occur in the present corner portions. Besides, if trying to improve the shape of disk q1 by force, then an excessive molding load must be applied to the upper and lower molds o and p, with the result that the upper and lower molds o and p can be broken.

Further, in the step to be executed after the material is mold-forged, the forged material is finished by grinding. Therefore, the grinding margin must be minimized in order to shorten the working time necessary for the grinding operation as much as possible. As a result of this, it is necessary to reduce the degree of abrasion in the upper and lower molds o and p during the forging operation, so that the lives of the upper and lower molds o and p can be inconveniently shortened.

In addition, since the upper and lower molds o and p are not structured such that they hold the cylindrical-shaped material n within their interior portions, the cylindrical-shaped material n is easy to shift from the centers of the upper and lower molds o and p, which results in the worsened working precision.

Thus, in order to eliminate the above-mentioned inconveniences found in the conventional disk manufacturing method, the present inventors have developed a conventionally unknown new disk manufacturing method as follows: that is, this disk manufacturing method is suitable for manufacturing a disk according to the invention and, especially, in addition to the disk according to the invention, the present method is ideal for manufacturing a disk which includes the before-mentioned respective means (i) and (iii).

In particular, the present disk manufacturing method comprises: a first step in which cylindrical-shaped material with its metal flows existing on the outer peripheral surface thereof and extending along the axial direction of the material is swaged using a first forging mold; a second step in which the swaged material is molded using a second forging mold to thereby form a portion of the inside diameter surface of the disk in the central portion of the upper end face of the material, and the shape of the molding surface of the second forging mold is transferred to the present inside diameter surface portion; and a third step in which the material obtained in the second step is molded using a third forging mold to thereby form a small diameter end portion, a traction surface and a large diameter end portion, the inside diameter surface portion molded in the second step is pushed further to such an extent as allows a residual wall to be left between the back surface of the large diameter end portion and the present inside diameter surface portion, and further a burr is formed on the outside diameter surface of the present large diameter end portion, wherein, after the burr and residual wall of the mold forged product obtained through the respective steps are removed, the mold forged product is ground to thereby form a disk having its final shape, and the thus ground disk is heat treated and is finished.

In the present disk manufacturing method, since the mold forging operation is carried out in three steps using three kinds of molds, the contact time between the mold and material can be shortened, which makes it possible to reduce the heat influence on the molds during the molding operation. As a result of this, the mold surface hardness can be maintained in a good level to thereby be able to improve the lives of the molds used.

Also, if the amount of swaging of the cylindrical-shaped material is increased in the first step, then it is possible to reduce the molding amounts not only in the second step but also in the third step in which a high molding load is required in order to obtain a shape approximate to the final shape of the product. As a result of this, the working burden of the forging mold in the second and third steps can be relieved so that the lives of the molds can be extended.

Further, the increased swaging amount of the cylindrical-shaped material in the first step can reduce not only the degree of push-in of the inside diameter surface portion of the forging mold in the second step but also the degree of further push-in of the forging mold inside diameter portion molded in the second step. This makes is possible to enhance greatly the life of the portion of the material of the forging mold that can be most influenced by heat.

Still further, since the mold forging operation is carried out in three steps using three kinds of molds, the flow of the material during the forging operation can be set freely. This means that a shape matched to the final shape of the product can be set in the previous steps (that is, in the first and second steps), thereby being able to provide a well-balanced mold forged product.

Yet further, because the disk is obtained by grinding the mold forged product, even if the forged product before ground is a rough forged product (for example, a hot-forged product), the present disk manufacturing method is sufficiently able to deal with such forged product; and, because there is little need to pay attention to the abrasion of the molds (that is, because, even if the molds wear to some degree, they can still be used), the costs of the molds can be reduced in the long run.

In addition, due to the fact that, in the third step, the burr is produced on the outside diameter surface of the large diameter end portion at the time when the molding operation is completed, tightly closed forging is avoided to thereby be able to prevent an unnecessary molding load from increasing. This makes it possible to improve the lives of the molds.

By the way, if the height H1 of the central portion of the material after it is swaged in the first step is set in the range of 80–120% of the height 2 of the material when the forged product is completed in the third step, then the enhanced lives of the molds in the second and third steps can be achieved effectively.

Also, in the above-mentioned first to third steps, by disposing positioning means which is capable of centering or positioning the respective forging molds with respect to the material, the material can be positioned accurately and positively in the molding center of the forging molds in each step. Thanks to this, the material can be always molded at the correct position to thereby be able to provide a high-precision mold forged product. That is, there can be provided a forged product in which a metal flow existing along the surface of the disk according to the present invention can be obtained by a post-machining operation.

Next, description will be given below of the conventional disk manufacturing method which is shown in FIGS. 19A to 19D. This is a method in which part of the inside diameter surface x of a disk q2 is molded when the material is forged by molds. That is, at first, as shown in FIG. 19B, the upper end portion of the cylindrical-shaped material n is drawn to thereby set the diameter of the present upper end portion smaller than the diameter of the small diameter end portion r and, next, the cylindrical-shaped material n is concentrically held by and between an upper mold y and a lower mold z and is then molded by a given amount (see FIG. 19C). The upper mold y includes a small diameter end portion molding surface s for molding the small diameter end portion r of the disk q2, a traction surface molding surface u for molding a traction surface t having a concave-arc shaped cross section, and a projection a1 which is provided in the central portion of the small diameter end portion molding surface s for molding a portion of the inside diameter surface x of the disk q2 from the small diameter end portion r side. On the other hand, the lower mold z includes a large diameter end portion molding surface w for molding the large diameter end portion v, and a projection a2 which is provided in the central portion of the large diameter end portion molding surface w for molding a portion of the inside diameter surface x of the disk q2 from the large diameter end portion v side.

Next, the upper and lower molds y and z are moved to approach each other further and the material n is forged several times in the axial direction thereof, whereby not only the small diameter end portion r and large diameter end portion v are molded respectively in the upper and lower end portions of the material n but also the traction surface t is molded between the small diameter end portion r and large diameter end portion v; and, then an operation to mold the inside diameter surface x by the projections a1 and a2 is started.

Next, as shown in FIG. 19D, the upper and lower molds y and z are moved further to approach each other most closely and the material n is mold-forged into the final shape of the disk q2. In this forging operation, the inside diameter surface x is held in a state where the residual wall a3 thereof is still left. After then, the residual wall a3 of the inside diameter surface x is removed by cutting or by grinding to thereby complete the inside diameter surface x and, at the same time, the material n is further ground, which completes the final product of the disk q2.

In the above-mentioned conventional disk manufacturing method, there occurs a phenomenon in which the end points of the metal flows m appearing in the upper and lower ends of the cylindrical-shaped material n in FIG. 19B are pulled into the interior of the cylindrical-shaped material n in FIG. 19C; and, as a result of this, the metal flows exist along the surface shape of the disk q2 ($\theta$=0 degree) ranging from the traction surface t to the small diameter end portion r and the portion of the inside diameter surface x that is located on the small diameter end portion r side thereof.

However, in the step shown in FIG. 19C, it is very difficult to mold the cylindrical-shaped material n in such a manner that the end points of the metal flows m are pulled into the interior of the cylindrical-shaped material n and, therefore, in most cases, the end points of the metal flows m are left somewhere on the upper and lower end faces of the material n. As a result of this, it is difficult to allow the metal flows having the angle of $\theta$=0 degree to exist positively along the surface of the disk q2.

Also, there is a high possibility that high-density nonmetallic inclusions existing in the neighboring portion of the central portion of the cylindrical-shaped material n can be left in the portion to which the bending stress is applied severely, that is, a portion ranging from the small diameter end face of the disk q2 axially to the portion of the inside diameter surface that extends in the ⅓ A range thereof, which has an ill effect on the life of the disk.

Thus, in order to eliminate the inconveniences found in the above-mentioned conventional disk manufacturing method, the present inventors have developed a conventionally unknown new disk manufacturing method as follows: that is, this disk manufacturing method is suitable for manufacturing a disk according to the invention and, especially, in addition to the disk according to the invention, the present method is ideal for manufacturing a disk which includes all of the before-mentioned means (i) to (v).

In particular, the present disk manufacturing method comprises: a first step in which a cylindrical-shaped material with metal flows existing on the outer peripheral surface thereof and extending along the axial direction thereof is swaged using a first forging mold and, at the same time, the upper end portion of the present cylindrical-shaped material is drawn; and, a second step in which the material obtained in the first step is molded using a second forging mold to thereby form a traction surface and a large diameter end portion and, at the same time, a portion of an inside diameter surface is formed in the central portion of the present material in such a manner that a residual wall is left between the back surface of the large diameter end portion and the present inside diameter surface portion. And, the present disk manufacturing method is characterized in that, when forming a portion of the inside diameter portion in the central portion of the material in the second step, the upper end portion of the present material is restricted by a portion of the second forging mold to thereby prevent the present upper end portion from increasing in diameter during the molding operation and, at the same time, high-density nonmetallic inclusions existing in the central portion of the present material are pushed into the lower end side of the material to thereby expand the lower end side of the material outwardly in the diameter direction thereof; and, further, after the residual wall of the mold forged product obtained through the respective steps is removed, the material is ground to thereby mold the same into the final shape of the disk and the thus molded disk is heat treated and finished.

In the present disk manufacturing method, it is possible to obtain a disk (a finished product) simply and positively in which the "metal flows existing along the disk surface" each having the angle of $\theta$=2–30 degrees exist respectively in the end face of the disk on the small diameter end portion side thereof, the traction surface of the disk, the outer peripheral surface of the large diameter end portion of the disk, and the back surface of the large diameter end portion thereof.

Also, partly because use of the mold forging operation makes it possible to reduce the diameter of the cylindrical-shaped material, partly because, in the second step, the upper end portion of the present material is restricted by a portion of the second forging mold to thereby prevent the present upper end portion from increasing in diameter during the molding operation, and partly because the high-density nonmetallic inclusions existing in the central portion of the present material are pushed into the lower end side of the material to thereby expand the lower end side of the material outwardly in the diameter direction thereof, there can be obtained simply and positively a disk in which the high-density nonmetallic inclusions do not exist in the following areas: that is, the area of the traction surface portion that receives the severest shearing stress in the traction surface portion, that is, the area extending in the depth direction from the traction surface by a distance less than 1.5 b; and, the area of the disk ranging axially from the end face of the small-diameter-end-portion side inside diameter surface portion receiving a severe bending stress due to formation of the peripheral groove for the snap ring up to the ⅓ A (A is the axial length of the disk) range portion.

By the way, preferably, in the second step, a burr may be produced on the outside diameter surface of the large diameter end portion at the time when the molding is completed. That is, the thus produced burr can avoid a tightly closed forging operation to thereby prevent an unnecessary molding load from increasing, which in turn makes it possible to enhance the lives of the molds.

Also, in the above-mentioned first and second steps, by disposing positioning means which is capable of centering or positioning the respective forging molds with respect to the material, the material can be positioned accurately and positively in the molding center of the forging molds in each step. Thanks to this, the material can be always molded at the correct position to thereby be able to provide a high-precision mold forged product.

DETAILED DESCRIPTION OF THE PREFERRED EMBODIMENTS

Figure 1:
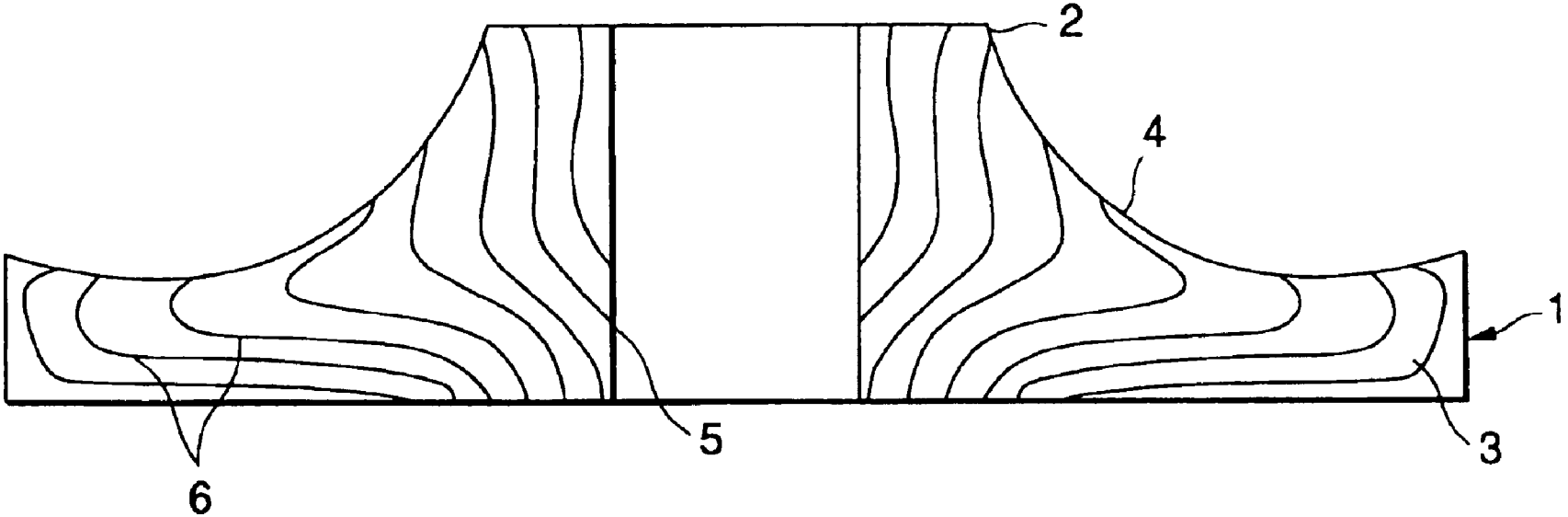
FIG. 1 is an is an explanatory view of a toroidal type continuously variable transmission disk which is a first embodiment according to the invention.
Figure 2:
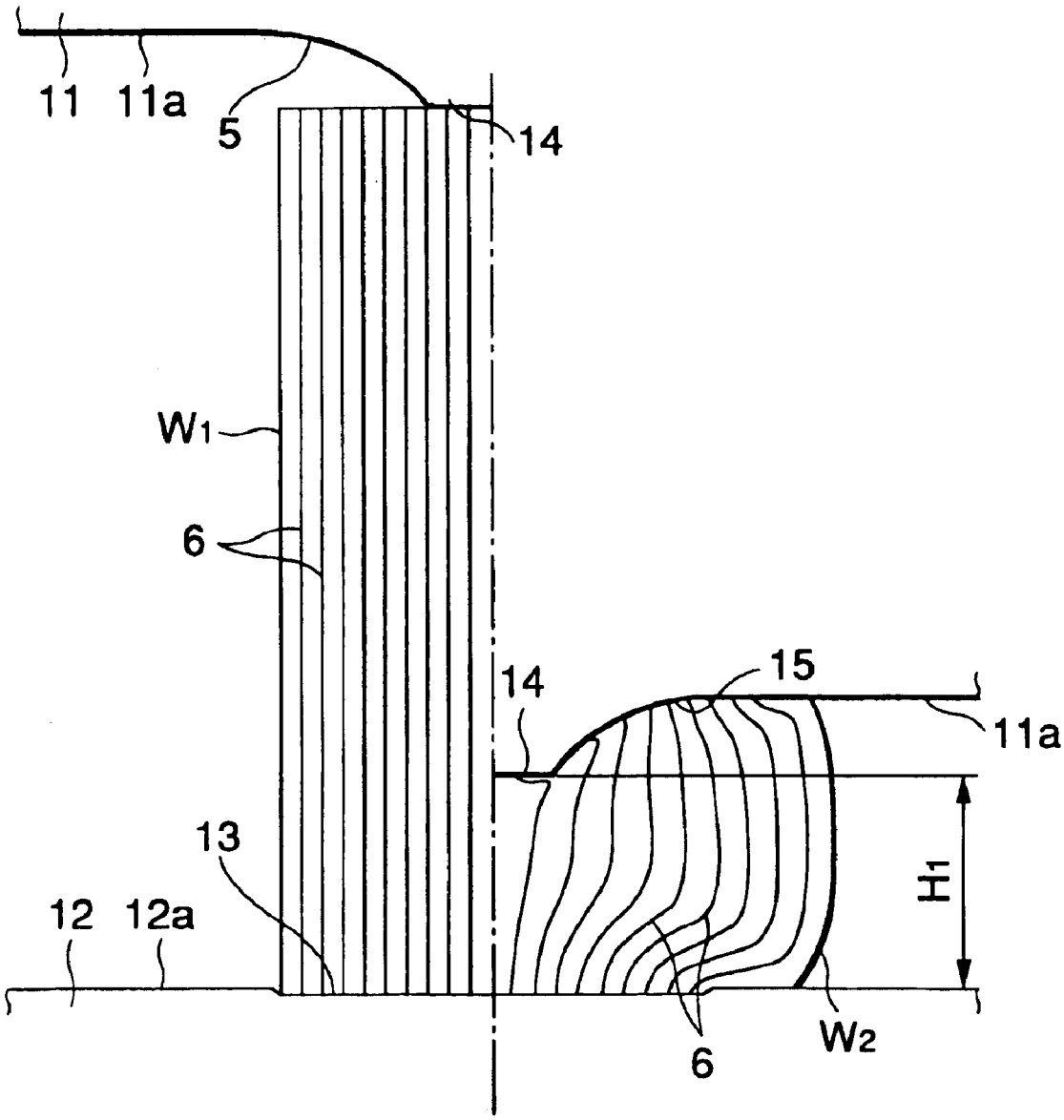
FIG. 2 is an explanatory view of a first step employed in a disk manufacturing method, in particular, the left half section shows a state of a disk material before molded, while the right half section shows a state of a disk material after molded.
Figure 3:
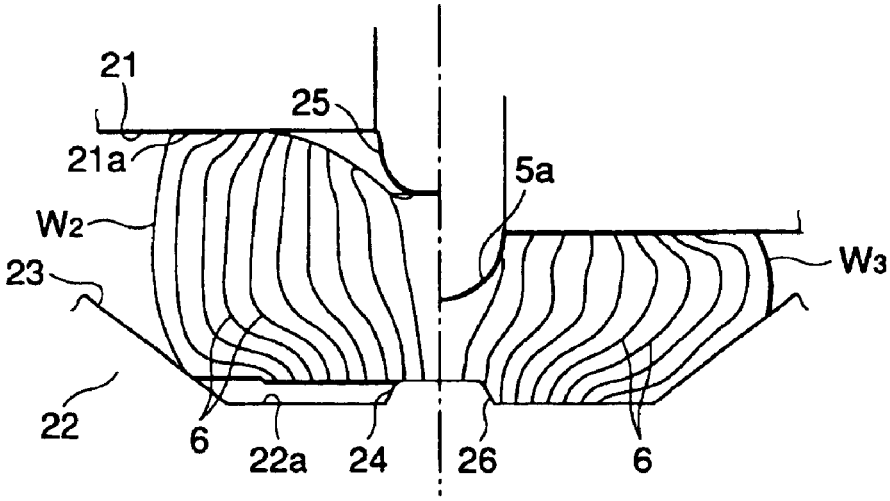
FIG. 3 is an explanatory view of a second step employed in the disk manufacturing method, in particular, the left half section shows a state of a disk material before molded, while the right half section shows a state of a disk material after molded.
Figure 4:
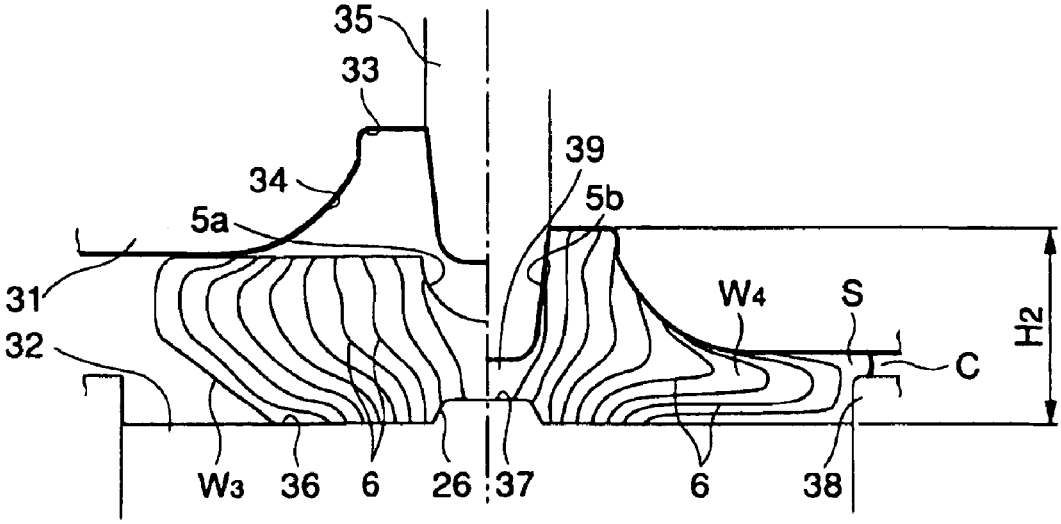
FIG. 4 is an explanatory view of a third step employed in the disk manufacturing method, in particular, the left half section shows a state of a disk material before molded, while the right half section shows a state of a disk material after molded.
Figure 5:
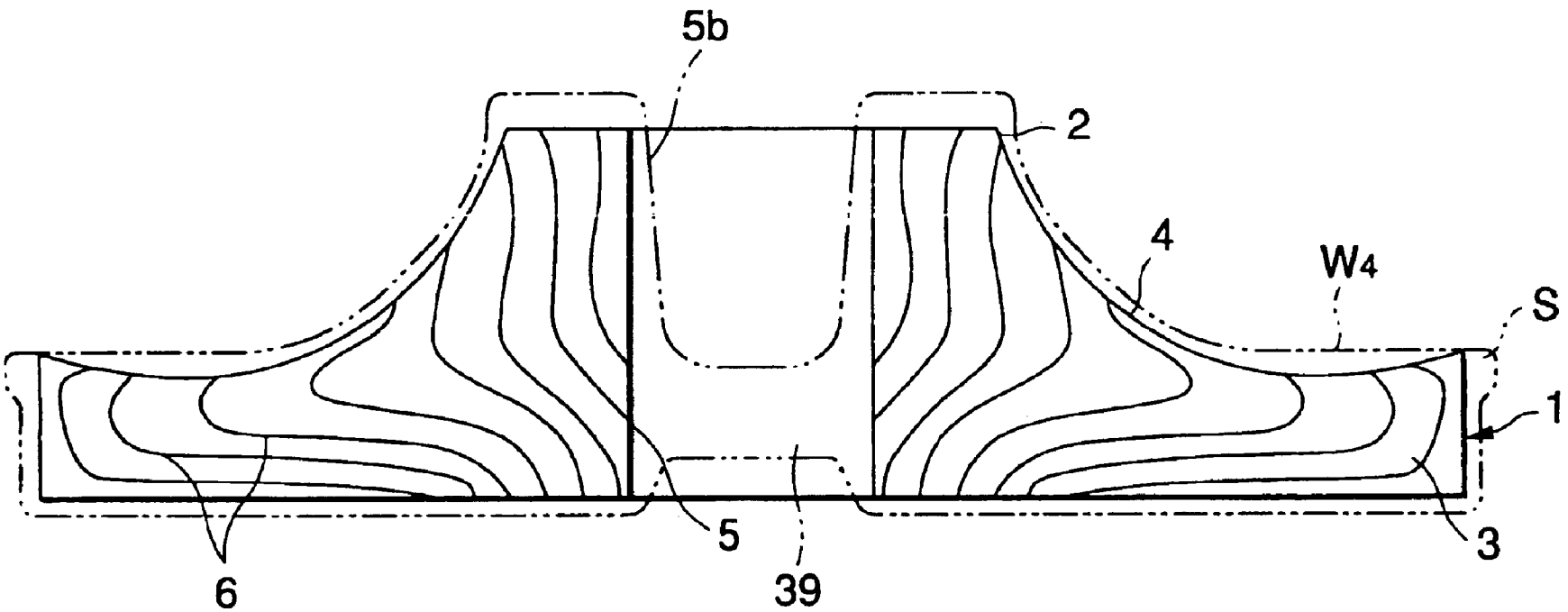
FIG. 5 is an explanatory view of an example of a final step employed in the disk manufacturing method.
Figure 6:
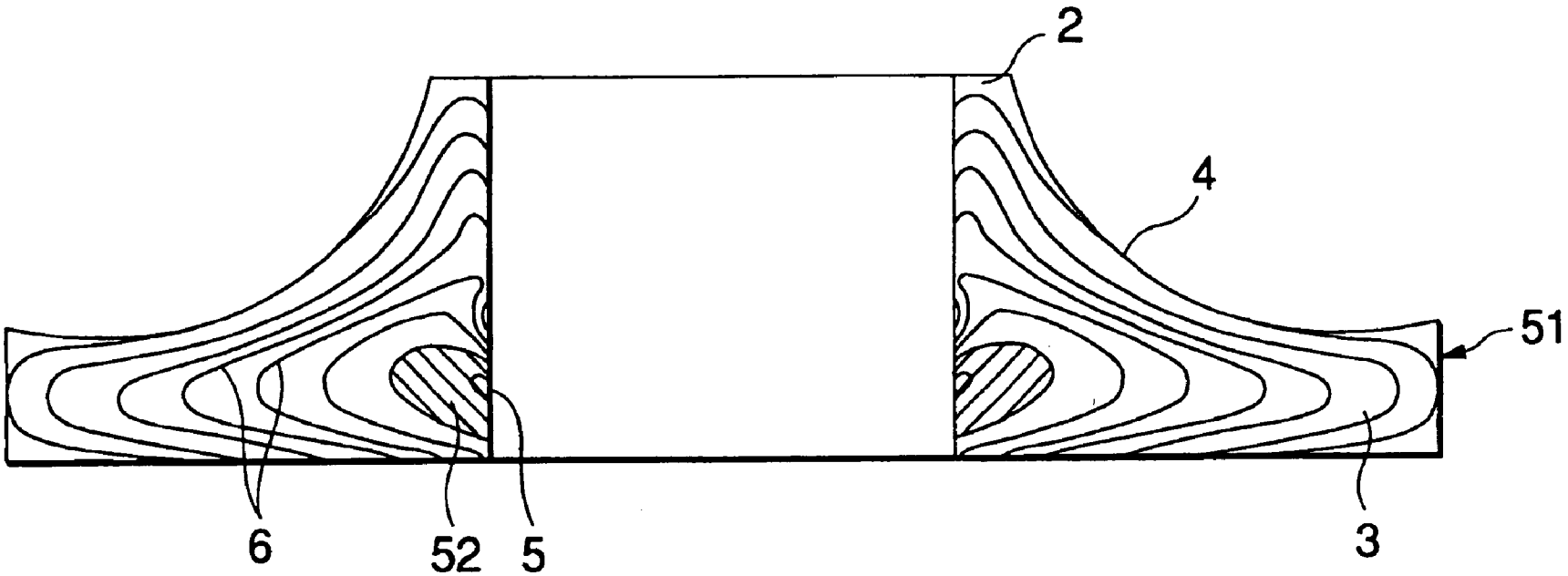
FIG. 6 is an explanatory view of a toroidal type continuously variable transmission disk which is a second embodiment according to the invention.
Figure 7:
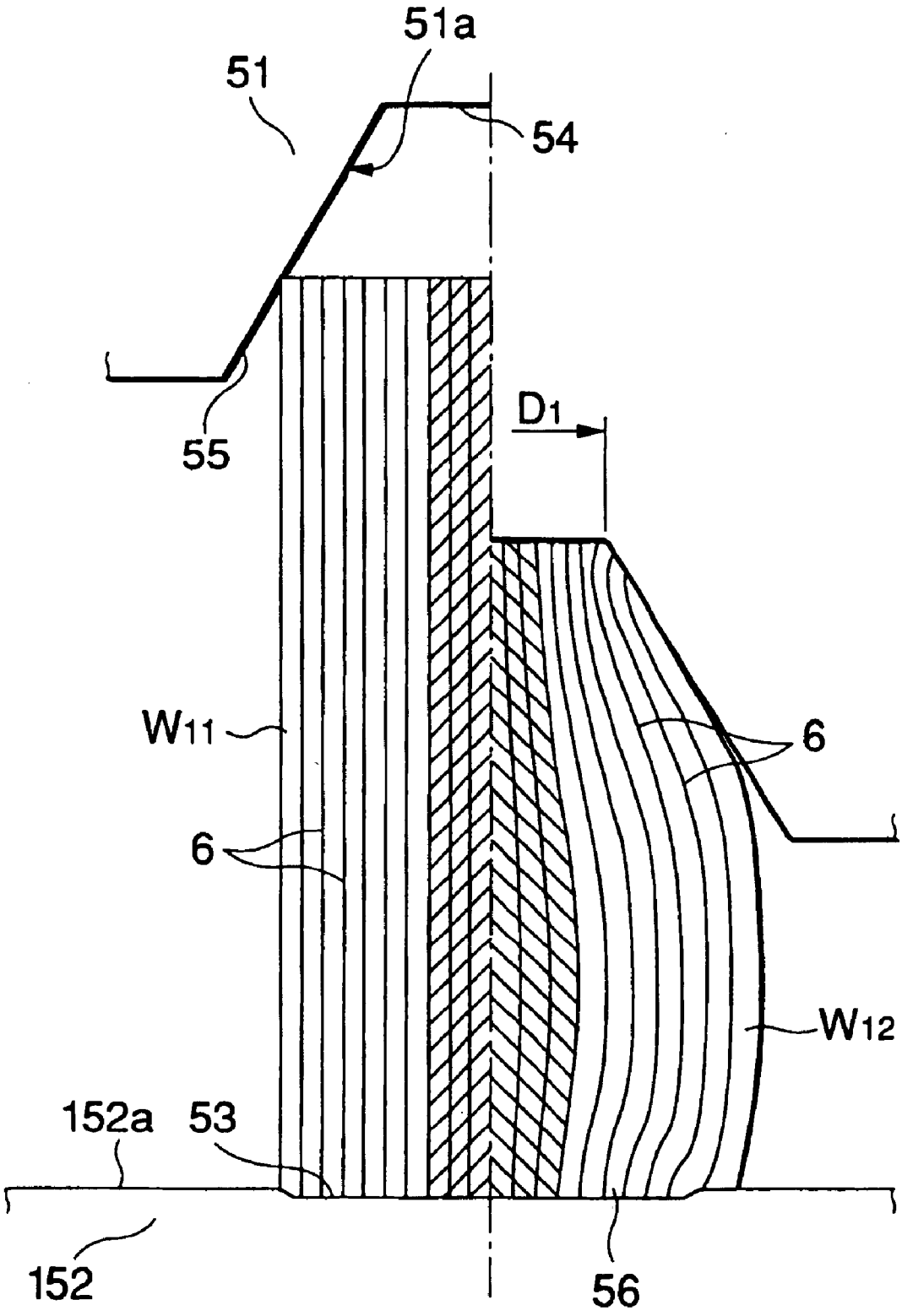
FIG. 7 is an explanatory view of a first step employed in a disk manufacturing method, in particular, the left half section shows a state of a disk material before molded, while the right half section shows a state of a disk material after molded.
Figure 8:
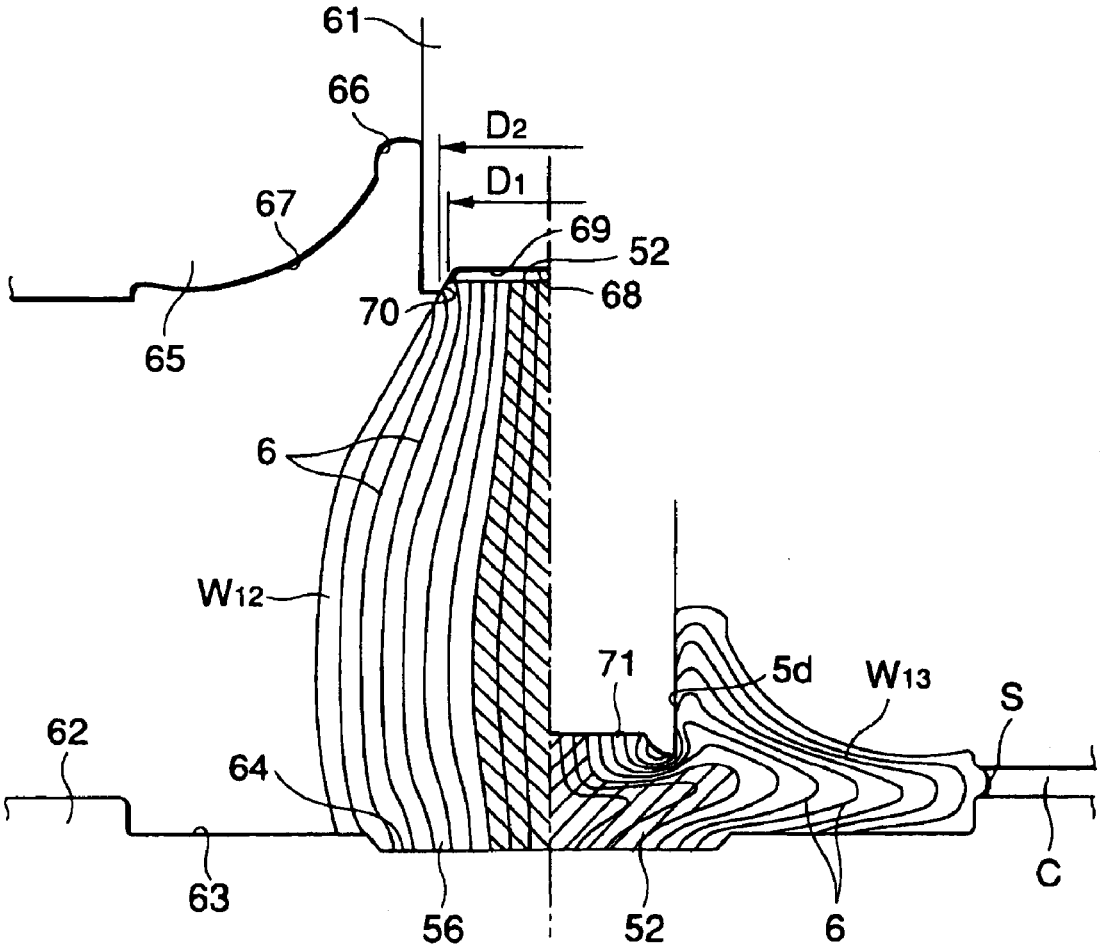
FIG. 8 is an explanatory view of a second step employed in the disk manufacturing method, in particular, the left half section shows a state of a disk material before molded, while the right half section shows a state of a disk material after molded.
Figure 9:
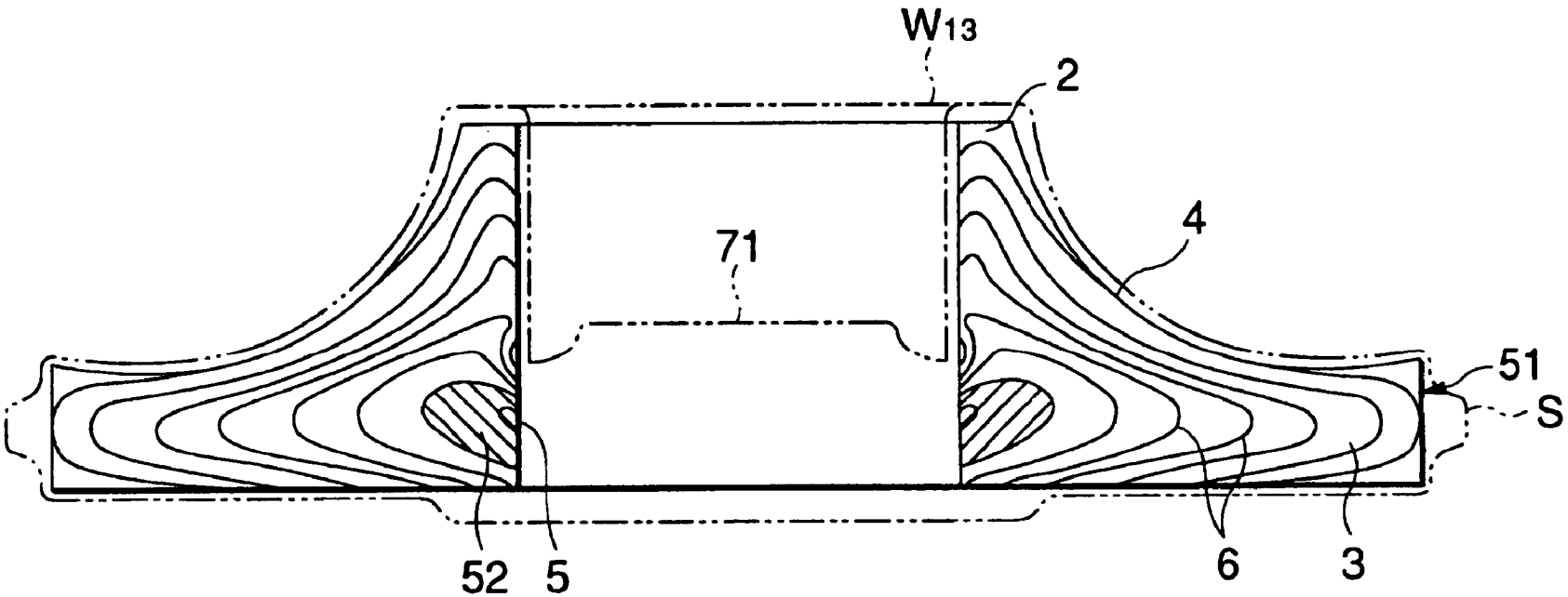
FIG. 9 is an explanatory view of an example of a final step employed in the disk manufacturing method.

Now, description will be given below of the preferred embodiments of a toroidal type continuously variable transmission according to the invention with reference to the accompanying drawings In particular, FIG. 1 is an explanatory view of the input and output disks of a toroidal type continuously variable transmission which are a first embodiment according to the invention; FIG. 2 is an explanatory view of a first step employed in a disk manufacturing method; FIG. 3 is an explanatory view of a second step employed in the disk manufacturing method; FIG. 4 is an explanatory view of a third step employed in the disk manufacturing method; FIG. 5 is an explanatory view of an example of a final step employed in the disk manufacturing method; FIG. 6 is an explanatory view of the input and output disks of a toroidal type continuously variable transmission which are a second embodiment according to the invention; FIG. 7 is an explanatory view of a first step employed in a disk manufacturing method; FIG. 8 is an explanatory view of a second step employed in the disk manufacturing method; and, FIG. 9 is an explanatory view of an example of a final step employed in the disk manufacturing method.

At first, description will be given below of a disk (a finished product) which is a first embodiment according to the invention with reference to FIG. 1. This disk 1 includes a traction surface 4 having a concave-arc-shaped cross section interposed between a small diameter end portion 2 and a large diameter end portion 3; and, in the central portion of the end face of the disk ion the small diameter end portion 2 side thereof, there is formed a through hole which extends therethrough up to the back surface of the large diameter end portion 3, while the inner peripheral surface of the through hole provides an inside diameter surface 5. Here, with reference to FIGS. land 14, among the metal flows 6 that exist in the disk 1, a metal flow 6, which has such a positional relationship with respect to the surface of the disk 1 that the metal flow 6 on the traction surface 4 side has an angle $\theta$ of 2–30 degrees, preferably, 5–20 degrees with respect to a tangent P of the traction surface 4, is defined as a "metal flow 6 along the disk surface".

In the disk 1, a "metal flow 6 along the disk surface" having the angle $\theta$=2–30 degrees exists in the traction surface 4; a "metal flow 6 along the disk surface" having the angle $\theta$=2–30 degrees exists in the area of the inside diameter surface 5 ranging from the end face of the inside diameter surface 5 on the small diameter end portion 2 side thereof to the range of ⅓ A, where the length of the disk 1 in the axial direction thereof is expressed as A; and, a "metal flow 6 along the disk surface" having the angle $\theta$=2–30 degrees exists in the outside diameter surface of the large diameter end portion 3 and in a portion of the back surface of the present large diameter end portion 3.

Figure 14:
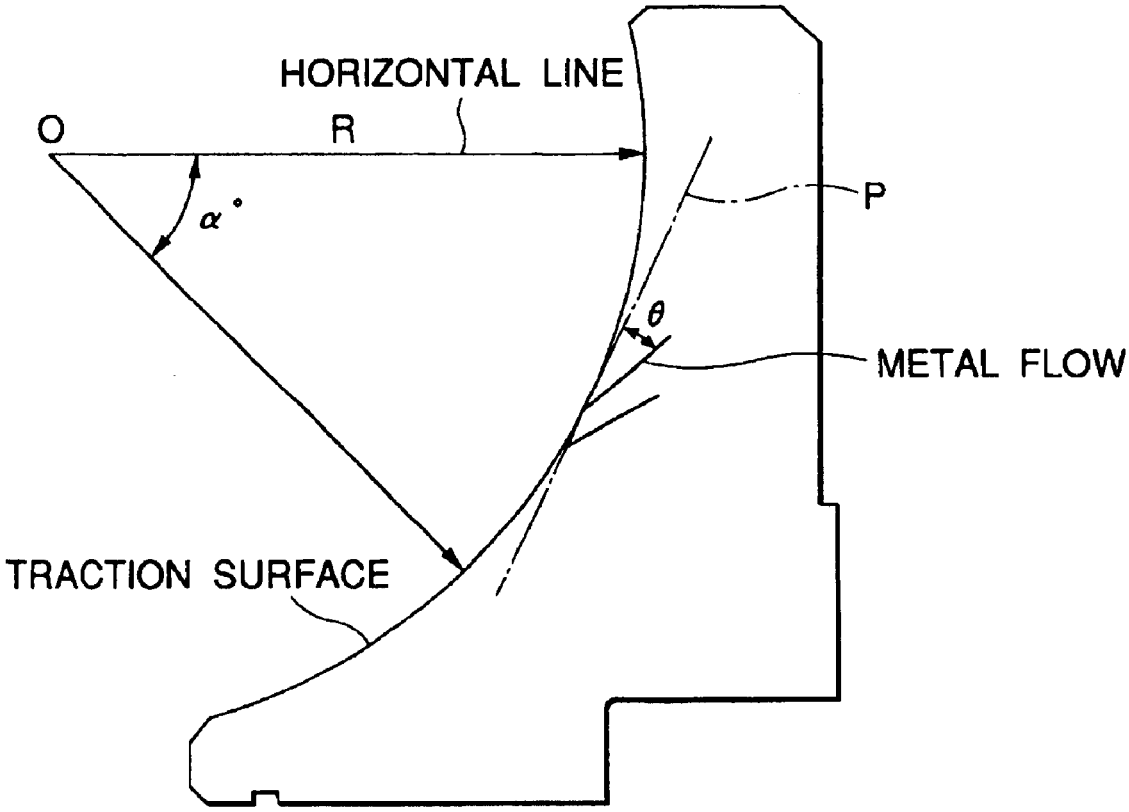
FIG. 14 is a view to explain the meanings of $\alpha$ and $\theta$.

Also, a "metal flow 6 along the disk surface" having the angle $\theta$=2–30 degrees exists in the traction surface 4 in such a manner that, with reference to FIG. 14, it extends along the peripheral direction of the traction surface 4 in the range of an angle $\alpha$ of 45 degrees with respect to a horizontal line passing through the center of curvature O of the traction surface 4 (that is, a line extending in parallel to the axis of the disk 1). By the way, a metal flow 6 having the angle $\theta$ of greater than 30 degrees with respect to the tangent P of the traction surface 4 becomes equivalent to an end flow (a metal flow which does not exist along the disk surface), so that such metal flow not only causes the material to peel off but also gives rise to the bending fatigue to the disk and thus the rupture of the disk (the lowered crack life).

In the thus structured disk 1, since the "metal flow 6 along the disk surface" having the angle $\theta$=2–30 degrees exists in the traction surface with which the power roller can be frictionally engaged with a large pressure, especially when the disk 1 is used under a low load condition, not only the material in the engaged portion of the traction surface 4 where it is frictionally engaged with the power roller can be prevented from peeling off, but also an impact crack or a fatigue crack is hard to occur in the disk 1 so that the long life of the disk 1 can be realized.

Also, because the "metal flow 6 along the disk surface" having the angle $\theta$=2–30 degrees exists in the area of the inside diameter surface 5 ranging from the end face of the inside diameter surface 5 on the small diameter end portion 2 side thereof to the range of ⅓ A, within the portion of the inside diameter surface 5 that is relatively weak against the bending stress and the like due to the formation of the peripheral groove for the snap ring, the metal flow can be prevented from providing an end flow, which makes it possible to realize the further longer life of the disk 1.

Figure 17:
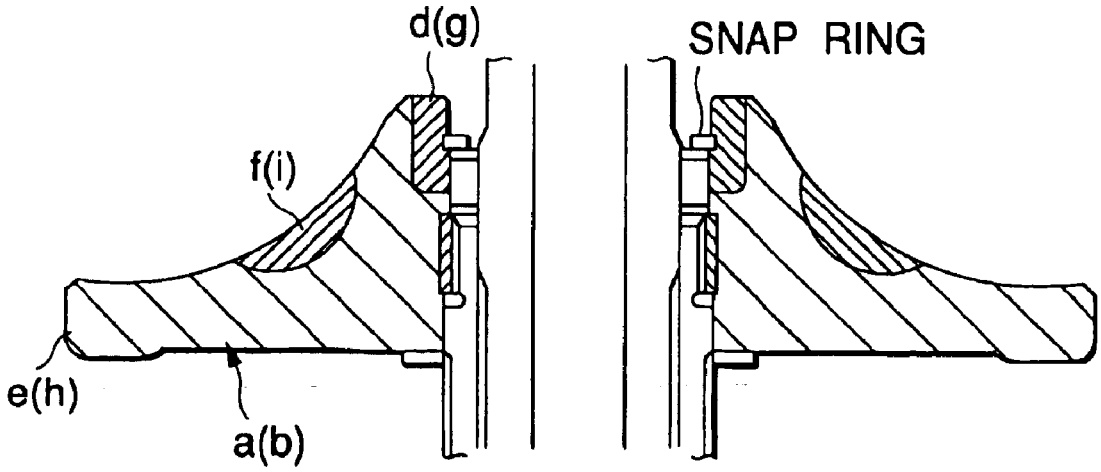
FIG. 17 is an explanatory view of a portion of a disk which receives large repeated bending stress and repeated shearing stress.
Figure 18A:
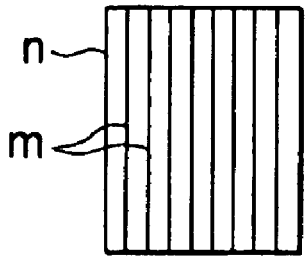
FIG.18A PRIOR ART
FIG. 18A–FIG. 18D are explanatory views of a conventional disk manufacturing method.
Figure 18B:
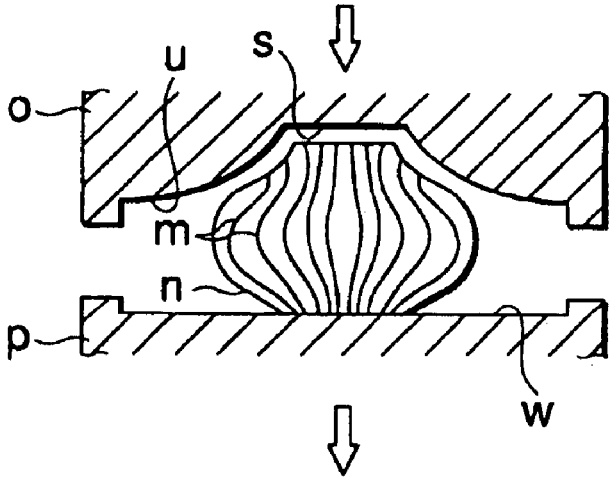
FIG.18B PRIOR ART
Figure 18C:
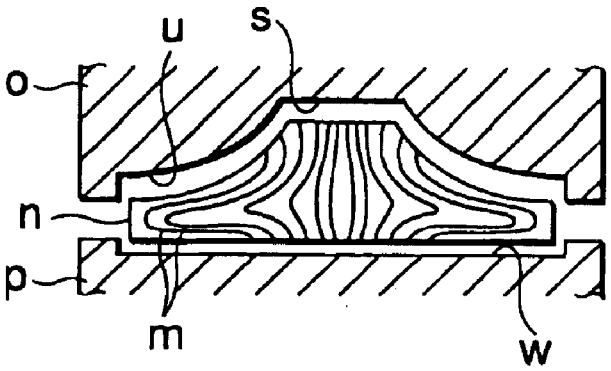
FIG.18C PRIOR ART
Figure 18D:
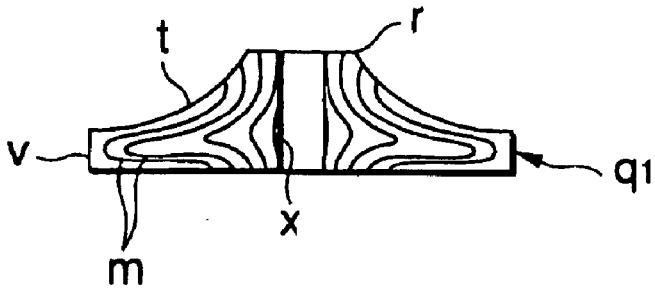
FIG.18D PRIOR ART
Figure 19A:
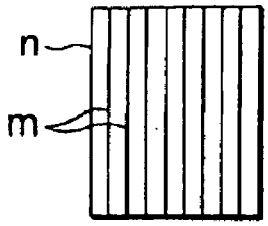
FIG.19A PRIOR ART
FIG. 19A–FIG. 19E are explanatory views of another conventional disk manufacturing method.
Figure 19B:
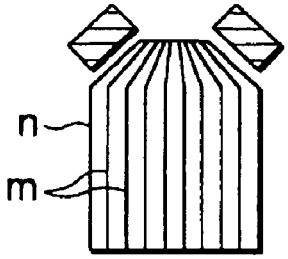
FIG.19B PRIOR ART
Figure 19C:
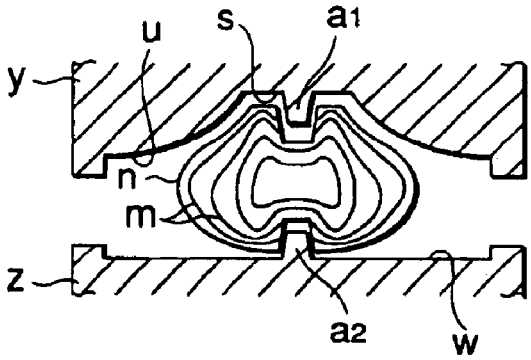
FIG.19C PRIOR ART
Figure 19D:
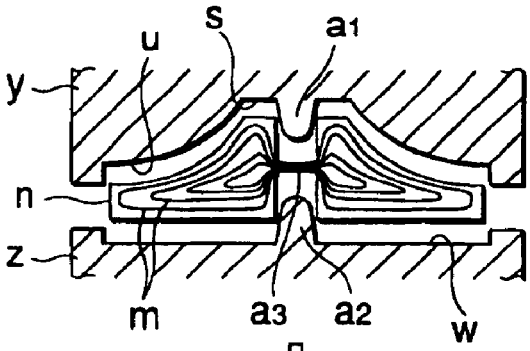
FIG.19D PRIOR ART
Figure 19E:
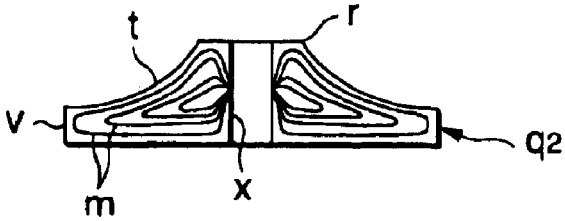
FIG.19E PRIOR ART

Further, since the "metal flow 6 along the disk surface" having the angle θ=2–30 degrees exists in the traction surface 4 in the range of an angle α of 45° C., the area of the traction surface 4 that receives the severest bending stress and the like in the traction surface 4 (see the fine hatching portion in FIG. 17) is covered by the "metal flow 6 along the disk surface", thereby being able to prevent effectively the breakage of the disk 1 caused by the bending stress and the like.

Next, description will be given below of a method for manufacturing the disk 1 with reference to FIGS. 2 to 5.

(First Step)

In FIG. 2, there is shown a first step (a swaging step) employed in the present disk manufacturing method. In particular, the left half section of FIG. 2 shows a state before the material is swaged, whereas the right half section of FIG. 2 shows a state after the material is swaged. In the first step, a cylindrical material (carburized steel or the like) W1 with metal flows 6 existing on the outer peripheral surface of the material and extending along the axial direction of the material is interposed between an upper mold 11 and a lower mold 12; and, next, the upper mold 11 is moved in the axial direction of the cylindrical-shaped material W1 to swage the present cylindrical-shaped material W1, thereby molding the same into a material W2 having such a shape as shown in the right half section of FIG. 2. Here, in the first step, a swaging ratio is set larger than an ordinary swaging ratio; and, in this case, if the height H1 of the central portion of the material W2 after swaged is set in the range of 80–120% of the height H2 of a material W4 which is shown in FIG. 4 and is obtained when the forging operation is completed, then the lives of forging molds used in second and third steps (which will be discussed later) can be enhanced effectively.

In the plane portion 12a of the lower mold 12, there is formed a recessed portion 13 into which the lower end portion of the cylindrical-shaped material W1 can be fitted; that is, if the lower end portion of the cylindrical-shaped material W1 is fitted into the recessed portion 13, then the cylindrical-shaped material W1 can be aligned with the lower mold 12 with accuracy. Also, in the central portion of the upper mold 11, there is provided a circular projecting portion 14 having a diameter smaller than the diameter of the cylindrical-shaped material W1; and, the circular projecting portion 14, in the swaging operation, molds the central portion of the cylindrical-shaped material W1 to thereby spread the diameter of the material. Further, between the outer peripheral side plane portion 11a outside of the circular projecting portion 14 of the upper mold 11 and the circular projecting portion 14, there is formed a curve molding surface 15 which is curved outwardly in the diameter direction of the upper mold from the circular projecting portion 14 in such a manner as to expand gradually and upwardly and also which continues with the plane portion 11a of the upper mold. The present curve molding surface 15 is capable of transferring the curved shape to the swaged material W2.

(Second Step: Intermediate Step)

Now, FIG. 3 shows a second step employed in the present disk manufacturing method; and, the left half section of FIG. 3 shows a state of the material before molded, whereas the right half section thereof shows a state of the material after molded. The function of the second step is to give the optimum shape to the material in order that the volume of the material can be distributed properly, that is, in order to be able to prevent the reduced thickness and burrs from occurring in a third step. If the shape of the material formed in the second step is not proper, then, when the material is molded in the third step, the burrs or the reduced thickness can be generated on the inside diameter corners (on the upper end side) of the material, or burrs on the outside diameter surface of the large diameter end portion of the material (which will be discussed later) can be reduced in the thickness thereof. Also, another function of the second step is to give the material such a shape which allows alignment to be achieved positively between the material W3 and mold in the third step.

Referring firstly to upper and lower molds 21 and 22 employed in the second step, in the central portion of the plane portion 21a of the upper mold 21, there is projectingly disposed a middle mold 25 which has a substantially conical-shaped projection. On the other hand, the lower mold 22 includes, in the portion thereof that is located near the outer periphery thereof, an inclined portion 23 which is inclined obliquely upwardly, that is, outwardly in the diameter direction of the material W2 swaged in the first step; and, the material W2 can be aligned with the lower mold 22 where the lower end side outer peripheral edge of the material W2 is in contact with the inclined portion 23 of the lower mold 22. At the then time, the lower end face of the material W2 is set in such a manner as to float slightly from the upper end face of a projecting portion 24 provided on the central plane portion 22a of the lower mold 22.

And, in this state, if the upper mold 21 and middle mold 25 are moved down integrally, then not only the middle mold 25 invades into the upper end face central portion of the material W2 to thereby form a recessed portion 5a which is a portion of the inside diameter surface 5, but also the plane portion 21a of the upper mold 21 presses against the upper end face of the material W2 to thereby apply a molding pressure; and, due to this molding pressure, as shown in the right half section of FIG. 3, the shapes of the plane portion 22a, inclined portion 23 and projecting portion 24 of the lower mold 22 are respectively transferred to the lower end portion of the material W2, so that the material W2 is molded into the shape of the material W3.

(Third Step)

Now, FIG. 4 shows a third step employed in the present disk manufacturing method; and, in particular, the left half section of FIG. 4 shows a state of the material before molded, whereas the right half section thereof shows a state of the blank after molded. In the third step, an upper mold 31 includes a small diameter end portion molding surface 33 for molding the small diameter end portion 2 of the disk 1, a traction surface molding surface 34 for molding the traction surface 4 having a concave-arc-shaped cross section, and a middle mold 35 which is disposed in the central portion of the small diameter end portion molding surface 33 and is used to mold a portion of the inside diameter surface 5 from the small diameter end portion 2 side; and, a lower mold 32 includes a large diameter end portion molding surface 36 for molding the large diameter end portion 3, and a projecting portion 37 which is disposed in the central portion of the large diameter end portion molding surface 36 concentrically with the middle mold 35. Onto the projecting portion 37, there can be fitted the recessed portion 26 of the material W3 to which the shape of the projecting portion 24 of the lower mold 22 was transferred in the second step. That is, if the recessed portion 26 is fitted with the projecting portion 37, then the material W3 can be positioned in the central portion of the lower mold 32 accurately and positively. Also, on the outer peripheral portion of the lower mold 32, there is disposed an outer mold 38; and, the outer mold 38 and lower mold 32 cooperate together in forming a molding space for forming a recess-shaped large diameter end portion.

And, in this state, if the upper mold 31 and middle mold 35 are moved down integrally, then not only the shapes of the small diameter end portion molding surface 33, traction surface molding surface 34 and large diameter end portion molding surface 36 are respectively transferred to the material W3, but also the middle mold 35 invades into the recessed portion 5a of the material W3 to thereby mold a recessed portion 5b, that is, a portion of the inside diameter 5 with a residual wall 39 left between the lower end side recessed portion and the recessed portion 5b. Thanks to this, as shown in the right half section of FIG. 4, the material W3 is molded into a material W4 having a shape approximate to the final shape of the disk 1. By the way, in the third step, at the time when the molding is completed, there is formed a clearance C between the upper mold 31 and outer mold 38 to thereby allow a burr S to be produced on the outside diameter surface of the large diameter end portion 3. That is, the production of the burr S can avoid a tightly closed forging operation to thereby prevent an unnecessary molding load from increasing, which makes it possible to improve the lives of the molds used.

In the mold forged product W4 obtained in the above manner, in a post-step, from a state shown by a two-dot chained line in FIG. 5, the burr S is trimmed and removed by a press and the residual wall 39 of the inside diameter surface 5 is removed by a press; and, after then, the whole surface of the mold forged product W4 is ground so that it is molded into the disk 1 having the final shape shown by a solid line in FIG. 5. And, after the disk 1 is molded in this manner, the disk 1 is carburized or carbonitrided, that is, the disk 1 is heat treated and further the heat treated disk 1 is ground in such a manner as to have a required precision, before the disk 1 is incorporated into a toroidal type continuously variable transmission.

In the present disk manufacturing method, since the mold forging operation is carried out in three steps using three kinds of molds, the contact time between the molds and material is shortened to thereby be able to reduce the heat influence on the molds in the molding operation. As a result of this, the mold surface hardness can be maintained in a good level, which in turn makes it possible to improve the lives of the molds.

Also, because the swaging amount of the cylindrical-shaped material W1 is set larger than the ordinary swaging amount in the first step, not only in the second step but also in the third step which requires a high molding load in order to obtain a state close to the shape of the product, the molding amount can be reduced, with the result that the working burdens of not only the forging molds 21 and 22 in the second step but also the forging molds 31 and 32 in the third step can be reduced, thereby being able to extend the lives of these forging molds.

Further, since the swaging amount of the cylindrical-shaped material W1 is set larger than the ordinary swaging amount in the first step, the push-in degree of the middle mold 25 in the second step as well as the push-in degree of the middle mold 35 in the third step can be reduced, which makes it possible to enhance greatly the tool lives of the middle molds 25 and 35 which can be most susceptible to the heat influence of the material.

Still further, due to the fact that the material is positioned at the molding centers of the molds accurately and positively in the respective steps including the first to third steps, the material can be always molded at a correct position to thereby obtain a mold forged product of high precision.

Yet further, since the mold forging operation is carried out in three steps using three kinds of molds, the material flow in the forging operation can be set freely. As a result of this, if the shape that corresponds with the final shape of the disk is set in the pre-steps (first and second steps), then a well-balanced mold forged product can be obtained.

In addition, because the disk 1 is obtained by grinding the mold forged product W4, even if the forged product before it is ground is a rough forged product (for example, a hot-forged product and the like), the present disk manufacturing method is surely able to deal with such forged product. Also, since it is little necessary to pay attention to the abrasion of the molds (that is, since the molds can be used even if they are abraded to some degree), the costs of the molds can be reduced in the long run.

Next, description will be given below of a disk for a toroidal type continuously variable transmission, which is a second embodiment according to the invention.

As shown in FIG. 6, the present disk (finished product) 51 includes a small diameter end portion 2, a large diameter end portion 3, and a traction surface 4 which is interposed between the small diameter end portion 2 and large diameter end portion 3 and has a concave-arc shaped cross section; and, in the central portion of the end face of the disk on the small diameter end portion 2 side thereof, there is formed a through hole which extends through the disk 51 up to the back surface of the large diameter end portion 3, while the inner peripheral surface of the through hole is used as an inside diameter surface 5 of the disk. Here, with reference to FIGS. 6 and 14, among the metal flows 6 that exist in the disk 51, a metal flow 6, which has such a positional relationship with respect to the surface of the disk 51 that the metal flow 6 on the traction surface 4 side has an angle θ of 2–30 degrees, preferably, 5–20 degrees with respect to a tangent P of the traction surface 4, is defined as a "metal flow 6 along the disk surface". In the disk 51, "metal flow 6 along the disk surface" each having the angle θ=2–30 degrees exist continuously in the end face of the disk 51 on the small diameter end portion 2 side thereof, in the traction surface 4, in the outside diameter surface of the large diameter end portion 3, and in the back surface of the large diameter end portion 3; and, a "metal flow 6 along the disk surface" having the angle θ=2–30 degrees exists in the area of the inside diameter surface 5 ranging from the end face of the inside diameter surface 5 on the small diameter end portion 2 side thereof to the range of ⅓ A, where the length of the disk 51 in the axial direction thereof is expressed as A.

By the way, a metal flow 6 having the angle θ of greater than 30 degrees with respect to the tangent P of the traction surface 4 becomes equivalent to an end flow (a metal flow which does not exist along the disk surface), so that such metal flow not only causes the material to peel off but also gives rise to the bending fatigue of the disk and thus the rupture of the disk (the lowered crack life).

Figure 10:
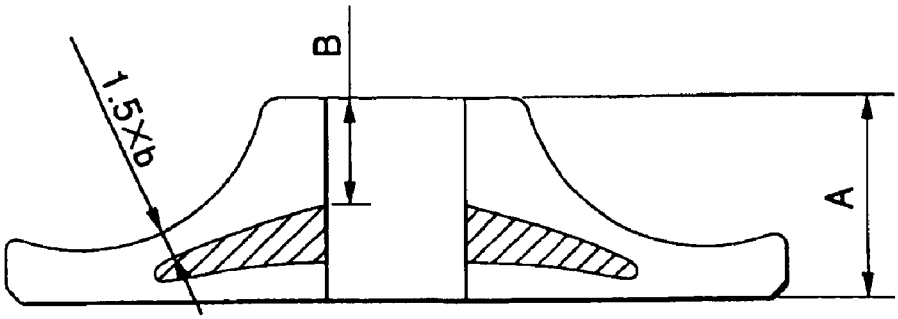
FIG. 10 is an explanatory view of the existing portion of the high-density nonmetallic inclusions in a disk.
Figure 11:
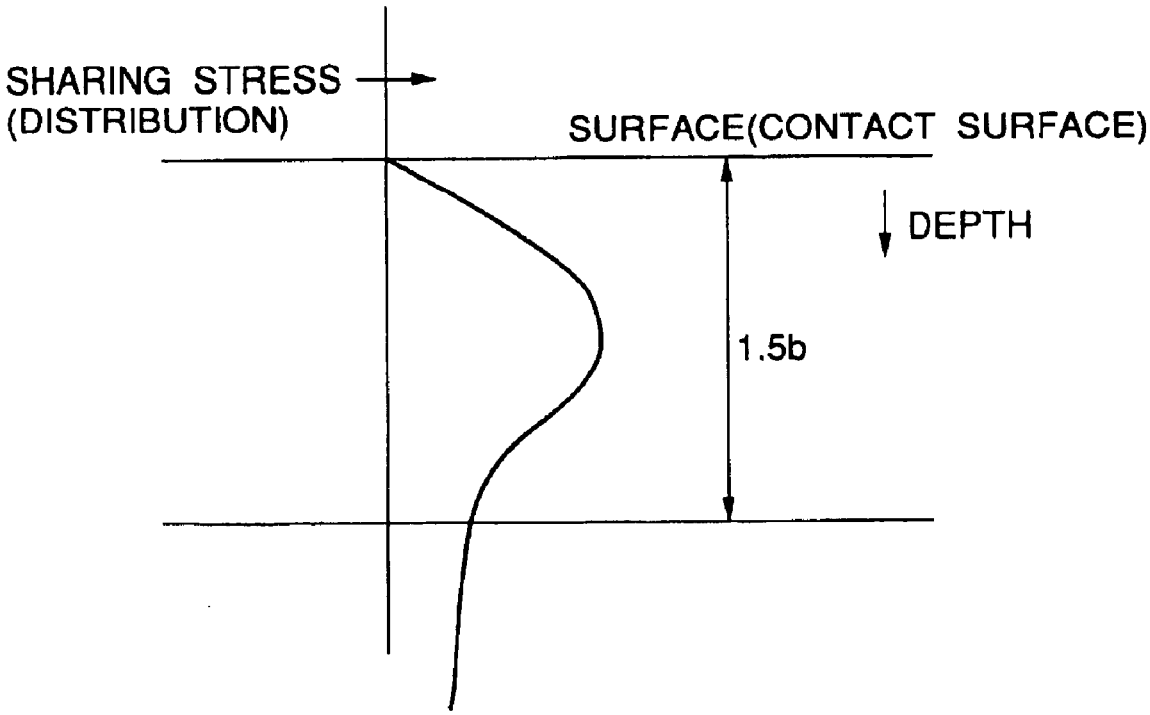
FIG. 11 is a graphical representation to explain the relationship between the depth from the surface of a traction surface and the distribution of shearing stress.
Figure 15:
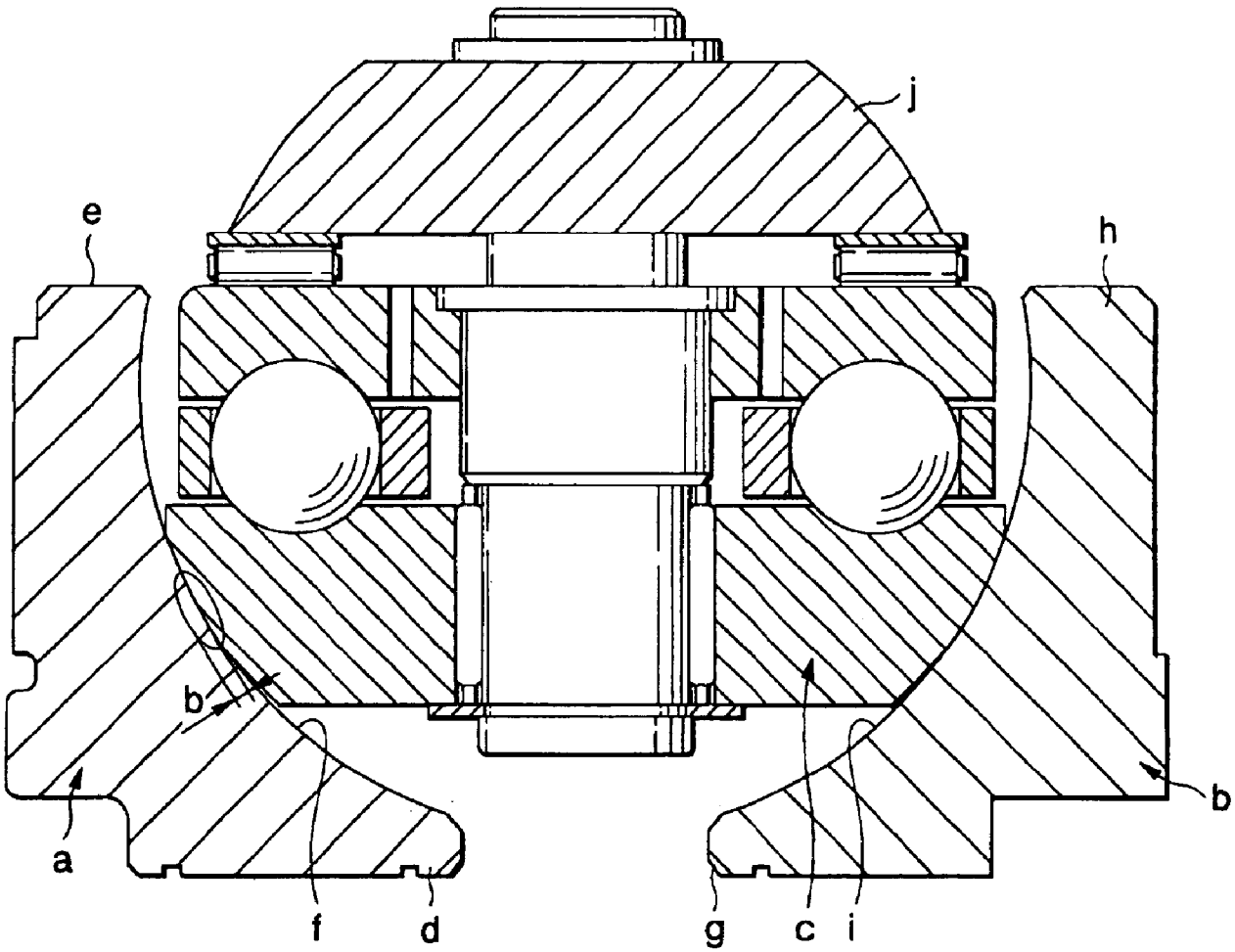
FIG.15 PRIOR ART
FIG. 15 is a section view to explain a toroidal type continuously variable transmission.
Figure 16:
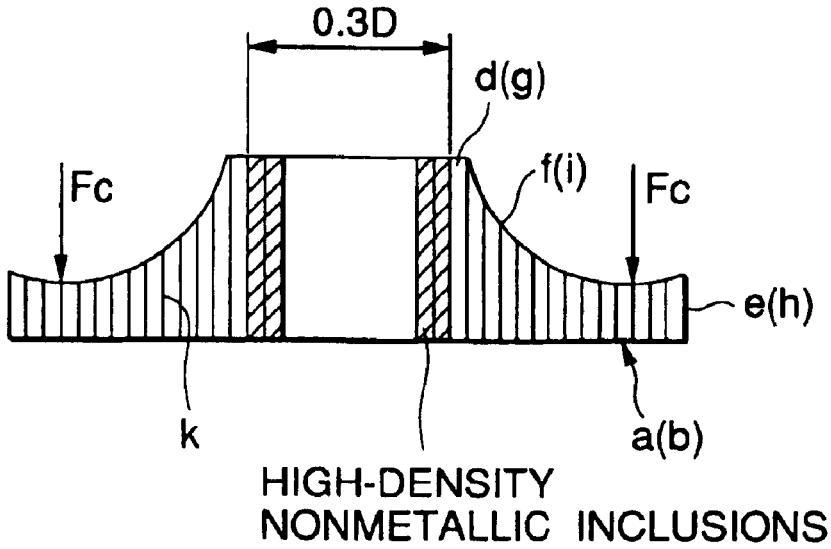
FIG.16 PRIOR ART
FIG. 16 is an explanatory view of a conventional disk.

Also, in the present disk 51, with further reference to FIGS. 10 and 15, when the power roller is set horizontal (that is, parallel to the axis of the disk), that is, where the small radius of the contact ellipse between the traction surface and power roller is expressed as b when a speed change ratio is 1:1, a nonmetallic inclusions 52 of high density exists in an area which is distant by 1.5 b or longer in the depth direction from the traction surface. Further, no nonmetallic inclusions are present in an area which exists within the range of ⅓ A (A is the length of the disk 51 in the axial direction thereof) from the end face of the inside diameter surface 5 on the small diameter end portion 2 side thereof.

In the thus structured disk 51, since the "metal flows 6 along the disk surface" each having the angle θ=2–30 degrees exist continuously in the traction surface 4 with which the power roller can be frictionally engaged with a large pressure, especially when the disk 51 is used under a high load condition, not only the material in the engaged portion of the traction surface 4 where it is frictionally engaged with the power roller can be prevented from peeling off, but also an impact crack or a fatigue crack is hard to occur in the disk 51 so that the long life of the disk 51 can be realized.

Also, because the "metal flow 6 along the disk surface" having the angle θ=2–30 degrees exists in the area of the inside diameter surface 5 ranging from the end face of the inside diameter surface 5 on the small diameter end portion 2 side thereof to the range of ⅓ A, within the portion of the inside diameter surface 5 that is relatively weak against the bending stress and the like due to the formation of the peripheral groove for the snap ring, the metal flow can be prevented from providing an end flow, and, at the same time, since the "metal flow 6 along the disk surface" having the angle θ=2–30 degrees exists in the end face of the disk 51 on the small diameter end portion 2 side thereof as well, the bending fatigue as well as the concentration of the stress on the peripheral groove can be relieved, which makes it possible to extend the life of the disk 51 further.

Further, the nonmetallic inclusions 52 of high density are absent not only in the area of the traction surface 4 that extends within the range of 1.5 b in the depth direction from the traction surface and receives the severest shearing stress in the traction surface, but also in the portion of the inside diameter surface 5 that extends axially within the range of ⅓ A from the small diameter end portion side end face of the inside diameter surface that can be affected severely by the bending stress or the like due to the formation of the peripheral groove for the snap ring and the like. This can avoid the ill effects of the nonmetallic inclusions on the life of the disk 51.

Next, description will be given below of a method for manufacturing the disk 51 with reference to FIGS. 7 to 9.

(First step: Swaging step)

Now, FIG. 7 shows a first step (a swaging step) employed in the present disk manufacturing method; and, in particular, the left half section of FIG. 7 shows a state of a material before swaged, whereas the right half section of FIG. 7 shows a state thereof after swaged. In the first step, a cylindrical material (carburized steel or the like) W11 with metal flows 6 existing on the outer peripheral surface of the material and extending along the axial direction of the material is interposed between an upper mold 51 and a lower mold 152; and, next, the upper mold 51 is moved in the axial direction of the cylindrical-shaped material W11 to swage the present cylindrical-shaped material W11, thereby molding the same into a material W12 having such a shape as shown in the right half section of FIG. 7.

In the plane portion 152a of the lower mold 152, there is formed a recessed portion 53 into which the lower end portion of the cylindrical-shaped material W11 can be fitted; that is, if the lower end portion of the cylindrical-shaped material W11 is fitted into the recessed portion 53, then the cylindrical-shaped material W11 can be aligned with the lower mold 152 accurately and positively.

On the other hand, in the central portion of the upper mold 51, there is formed a tapered recessed portion 51a which decreases in diameter in the upward direction thereof in such a manner as to be concentric with the recessed portion 53 of the lower mode 152, while the bottom surface of the present tapered recessed portion 51a is formed as a flat surface 54. And, the peripheral edge (a boundary portion between the outer peripheral surface and upper end face of the cylindrical-shaped material W11) of the upper end face of the cylindrical-shaped material W11 is in contact with the slanting portion 55 of the tapered recessed portion 51a. Thanks to this, when the upper mold 51 is moved down, the upper mold 51 restricts the upper end portion of the cylindrical-shaped material W11 to thereby be able to not only align the cylindrical-shaped material W11 with the upper mold 51 accurately and positively but also transfer the shape of the slanting portion 55.

(Second step)

Now, FIG. 8 shows a second step employed in the present disk manufacturing method; and, in particular, the left half section of FIG. 8 shows a state of the material before molded, whereas the right half section of FIG. 8 shows a state thereof after molded. In the second step, the material W12 swaged in the first step is interposed between a lower mold 62 and an upper mold 61 mounted on an outer mold 65 and the upper mold 61 is moved in the axial direction of the material W12 to thereby mold the material W12 into a material W13 which has such a shape approximate to the final shape of the disk 51 as shown in the right half section of FIG. 8.

The lower mold 62 includes a large diameter end portion molding surface 63 for molding the large diameter end portion 3 of the disk 51 and, in the central portion of the large diameter end portion molding surface 63, there is a recessed portion 64 into which a projecting portion 56 (to which the shape of the recessed portion 53 of the lower mold 52 was transferred in the first step) can be fitted. That is, if the projecting portion 56 of the material W12 is fitted into the recessed portion 64 of the lower mold 62, then the material W12 is prevented from playing with respect to the lower mold 62 so that the alignment of the material W12 with the lower mold 62 can be achieved accurately and positively.

The outer mold 65 includes a small diameter end portion molding surface 66 for molding the small diameter end portion 2 of the disk 51 and a traction surface molding surface 67 for molding the traction surface 4; and, in the central portion of the small diameter end portion molding surface 66, there is projectingly provided the upper mold 61 having a cylindrical shape.

In the lower end face of the upper mold 61, there is formed a shallow tapered recessed portion 68 which reduces gradually in diameter as it goes upwardly. The bottom surface of the tapered recessed portion 68 is formed as a flat surface 69 and the diameter of the flat surface 69 is set larger than the area diameter of nonmetallic inclusions 52 of high density which exist in the central portion of the upper end face of the material W12 swaged in the first step. Also, since the outer peripheral surface of the upper end portion of the material W12 is in contact with the slanting portion 70 of the tapered recessed portion 68, the alignment of the material W12 with the upper mold 61 can be achieved accurately and positively. Therefore, the inside diameter D2 of the slanting portion 70 of the tapered recessed portion 68, in particular, the inside diameter D2 of the contact position of the slanting portion 70 with the material W12 is larger than the diameter D1 of the upper end face of the material W12.

And, in this state, if the outer mold 65 and upper mold 61 are moved down integrally, then not only the shapes of the small diameter end portion molding surface 66, traction surface molding surface 67 and large diameter end portion molding surface 63 are respectively transferred to the material W12, but also the upper mold 61 invades into the central portion of the material W12 to thereby mold a recessed portion 5d, that is, a portion of the inside diameter 5 with a residual wall 71 left between the recessed portion 64 and the present recessed portion 5d. Thanks to this, as shown in the right half section of FIG. 8, the material W12 is molded into a material W13 having a shape approximate to the final shape of the disk 51. By the way, in the second step, at the time when the molding is completed, there is formed a clearance C between the lower mold 62 and outer mold 65 to thereby allow a burr S to be produced on the outside diameter surface of the large diameter end portion 3. That is, the production of the burr S can avoid a tightly closed forging operation to thereby prevent an unnecessary molding load from increasing, which makes it possible to improve the lives of the molds used.

Also, when the upper mold 61 invades into the central portion of the material W12, not only the tapered recessed portion 68 of the upper mold 61 restricts the upper end portion of the material W12 to thereby prevent the present upper end portion from increasing in diameter during molding, but also the nonmetallic inclusions 52 of high density existing in the central portion of the material W12 are pushed into the lower end side of the material W12 to thereby expand the present lower end side outwardly in the diameter direction of the material W12.

In the mold forged product W13 obtained in the above manner, in a post-step, from a state shown by a two-dot chained line in FIG. 9, the burr S is trimmed and removed by a press and the residual wall 71 of the inside diameter surface 5 is removed by a press; and, after then, the whole surface of the mold forged product W13 is ground so that it is molded into the disk 51 having the final shape shown by a solid line in FIG. 9. And, after the disk 51 is molded in this manner, the disk 51 is carburized or carbonitrided, that is, the disk 51 is heat treated and further the heat treated disk 51 is ground in such a manner as to have a required precision, before the disk 51 is incorporated into a toroidal type continuously variable transmission.

As can be seen clearly from the above description, in the present disk manufacturing method, it is possible to obtain the disk 51 (finished product) simply and positively in which "metal flows 6 along the disk surface" each having the angle θ=2–30 degrees exist in the end face of the disk 51 on the small diameter end portion 2 side thereof, in the traction surface 4, in the outside diameter surface of the large diameter end portion 3, and in the back surface of the large diameter end portion 3.

Also, not only since use of the mold forging method can reduce the diameter of the cylindrical-shaped material W11 in the first step, but also since, in the second step, the tapered recessed portion 68 of the upper mold 61 restricts the upper end portion of the material W12 to thereby prevent the present upper end portion from increasing in diameter during molding and also the nonmetallic inclusions 52 of high density existing in the central portion of the material W12 are pushed into the lower end side of the material W12 to thereby expand the present lower end side outwardly in the diameter direction of the material W12, there can be obtained the disk 51 simply and positively in which the nonmetallic inclusions 52 of high density are absent not only in the area of the traction surface 4 that extends within the range of 1.5 b in the depth direction from the traction surface and receives the severest shearing stress in the traction surface, but also in the portion of the inside diameter surface 5 that extends axially within the range of ⅓ A from the small diameter end portion side end face of the inside diameter surface that can be affected severely by the bending stress or the like due to the formation of the peripheral groove for the snap ring and the like.

Now, Table 1 shows the results of a disk durability test in which, when it is assumed that a load is 5 tons and a load position is the groove bottom of the traction surface, the respective disks are tested in the durability thereof by changing the angle α (see FIG. 14). Here, the angle α is an angle formed between the traction surface 4 and a horizontal line passing through the center of curvature O (that is, a line extending in parallel to the axis of a disk).

In Table 1, disks No. 1 to No. 6 are respectively embodiments according to the invention. In particular, in each of the disks No. 1 to No. 4, the "metal flow 6 along the disk surface" having the angle θ=2–30 degrees exists in the traction surface thereof. Also, among these disks, in the No. 1 and No. 2 disks, the angle is set such that α<45 degrees and, in the No. 3 and No. 4 disks, the angle is set such that α≧45 degrees. And, as the No. 5 and No. 6 disks, there were used disks in which the "metal flows 6 along the disk surface" having the angle θ=2–30 degrees exist continuously in the traction surface thereof. On the other hand, as the No. 7 and No. 8 disks, there were used conventional disks which were manufactured by cutting. Except for the above-mentioned conditions, the same test conditions (such as size, material, load condition and the like) were set for all the disks in the present disk durability test.

By the way, the angle was adjusted to θ=2–30 degrees by previously checking a metal flow after forged and by adjusting the margin. In particular, a metal flow having the angle θ smaller than or equal to the angle α is assumed as a metal flow along the disk surface which satisfies the θ range according to the invention; and, a metal flow having the angle θ larger than the angle α is assumed as a metal flow which has an angle out of the θ range according to the invention. That is, the disks were observed for breakage under the above conditions. The forged disks were manufactured by using the above-mentioned two manufacturing methods properly.

TABLE 1

| No. | | α[deg.] | Test Result | Judgment |
|---|---|---|---|---|
| 1 | Embodiment | 27 | Broken in 123 hrs. | Δ |
| 2 | Embodiment | 37 | Broken in 194 hrs. | Δ |
| 3 | Embodiment | 48 | Vibrated in 289 hrs. Crack in traction surface | ○ |
| 4 | Embodiment | 50 | Vibrated in 272 hrs. Crack in traction surface | ○ |
| 5 | Embodiment | — | Nothing wrong in 350 hrs. | ◎ |
| 6 | Embodiment | — | Nothing wrong in 350 hrs. | ◎ |
| 7 | Conventional Example | — | Broken in 97 hrs. | X |
| 8 | Conventional Example | — | Broken in 63 hrs. | X |

Load: approx. 5 ton

Load position: Groove bottom

As can be seen clearly from Table 1, the disks (No. 1 to No. 6) according to the invention are greatly enhanced in the durability of the traction surface thereof when compared with the conventional disks (No. 7 and No. 8).

Also, among the disks according to the invention, the disks having $\alpha \geqq 45$ degrees (No. 3 and No. 4) are enhanced in durability when compared with the disks having $\alpha < 45$ degrees; and, in the disks (No. 5 and No. 6) in which the "metal flows 6 along the disk surface" having the angle $\theta = 2$–30 degrees exist continuously in the traction surface thereof, even after 350 hours have passed, there was found nothing wrong on the traction surface thereof, that is, it can well be said that they have the greatest durability.

By the way, although the present durability test was finished in 350 hrs., in the disks having $\theta \approx 0$ degree and $\theta \approx 2$ degrees, it is believed that nothing wrong can be found even after the passage of 350 hrs. and thus it can be expected that these disks are almost equivalent to the disks No. 5 and No. 6 in performance.

Figure 12:
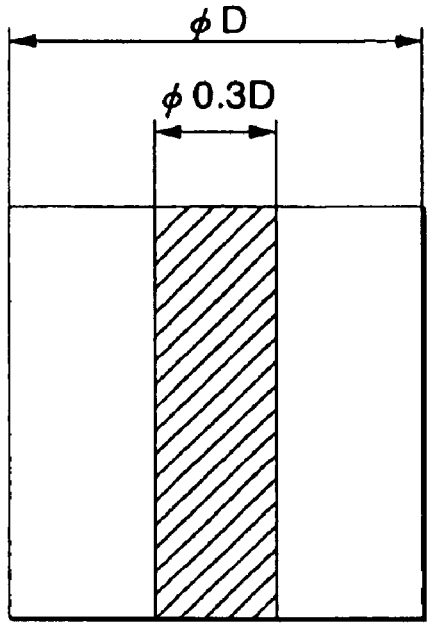
FIG. 12 is an explanatory view of the existing portion of the high-density nonmetallic inclusions in a cylindrical-shaped material before molded.
Figure 13:
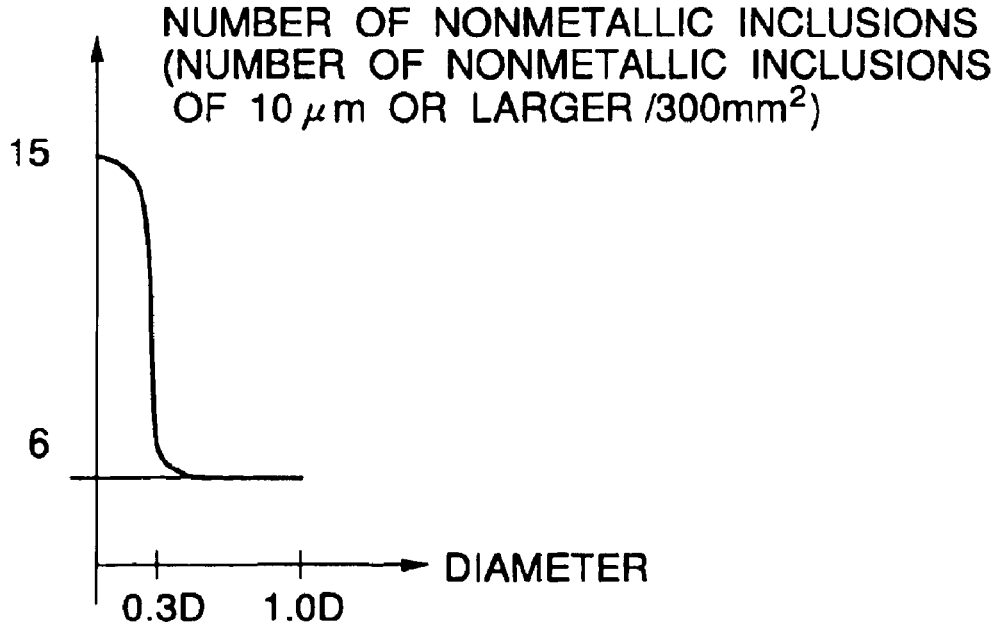
FIG. 13 is a graphical representation to explain the relationship between the diameter of the cylindrical-shaped material before molded and the number of nonmetallic inclusions.

Now, Table 2 shows the results of a second disk durability test in which the depth of a disk ranging from the traction surface thereof to the area of the high-density nonmetallic inclusions (0.3 D portion: see FIGS. 10 and 12) is caused to vary. By the way, in Table 2, b designates the small radius of the contact ellipse between the traction surface and power roller when a speed change ratio is 1:1 (see FIG. 15).

In Table 2, disks No. 1 to No. 8 are all embodiments according to the invention and, for each of the disks, there was used a disk in which the "metal flow 6 along the disk surface" having the angle $\theta = 2$–30 degrees exists in the traction surface thereof. The present durability test was conducted for all disks under the same conditions, except that the depth of a disk ranging from the traction surface thereof to the area of the high-density nonmetallic inclusions varies in the respective disks.

TABLE 2

| No. | Depth of 0.3 D portion from surface | Test Result | Judgment |
|---|---|---|---|
| 1 | 0 | Traction surface peels off in 170 hrs. | Δ |
| 2 | 0.25 b | Traction surface peels off in 173 hrs. | Δ |
| 3 | 0.60 b | Traction surface peels off in 212 hrs. | ○ |
| 4 | 0.90 b | Traction surface peels off in 208 hrs. | ○ |
| 5 | 1.25 b | Traction surface peels off in 239 hrs. | ○ |
| 6 | 1.6 b | Nothing wrong in 250 hrs. | ◎ |
| 7 | 2.55 b | Nothing wrong in 250 hrs. | ◎ |
| 8 | 4.5 b | Nothing wrong in 250 hrs. | ◎ |

b: Small radius of contact ellipse between traction surface and power roller when speed change ratio is 1:1

As can be clearly understood from Table 2, as the depth of the 0.3 D portion from the traction surface to the high-density nonmetallic inclusions area increases, the durability of the traction surface is enhanced and, especially, the depth is larger than or equal to 1.5 b, nothing wrong is found even after 250 hrs. have passed, which shows that the traction surface having the depth larger than or equal to 1.5 b is most excellent in durability.

Now, Table 3 shows the results of a third durability test conducted on disks which are different from each other in the existing area of the high-density nonmetallic inclusions of the disk inside diameter surface, in particular, on the durability of the inside diameter surfaces of the disks on their respective small diameter end portion sides. Here, A expresses the axial length of the disk (that is, the length of the disk in the axial direction thereof), and B expresses the axial length of the inside diameter surface from the end face of the inside diameter surface on the small diameter end portion side thereof.

In Table 3, No. 3 to No. 8 test pieces are disks which were manufactured according to the embodiments of the invention. In the present durability test, as the embodiments of the invention, there were used disks in each of which the "metal flow 6 along the disk surface" having the angle $\theta = 2$–30 degrees exists in the inside diameter surface thereof in the range from the small diameter end portion side end face of the inside diameter surface to the axial depth of $(B/A) \times 100\%$ where the axial length of the disk is expressed as A. Also, as No. 1 and No. 2 disks, there were used conventional disks which were manufactured by cutting. That is, in the present durability test, all disks were tested under the same conditions, except that the disks differ from each other in the existing area of the high-density nonmetallic inclusions of the disk inside diameter surface. By the way, in the disks No. 3 to No. 8, the relationship between the nonmetallic inclusions and their respective existing area $(B/A) \times 100\%$ were adjusted by adjusting the margins of the respective disks when they were manufactured. In this case as well, as the test disks, there were properly used forged disks which were manufactured according to the above-mentioned two manufacturing methods.

TABLE 3

| No. | | Working Method | (B/A) × 100 [%] | Test Result | Judgment |
|---|---|---|---|---|---|
| 1 | Conventional Example | Cutting | — | Inside diameter portion on small diameter side was broken in 68 hrs. | X |
| 2 | Conventional Example | Cutting | — | Inside diameter portion on small diameter side was broken in 59 hrs. | X |
| 3 | Embodiment | Forging | 15 | Inside diameter portion on small diameter side was broken 171 hrs. | Δ |
| 4 | Embodiment | Forging | 22 | Inside diameter portion on small diameter side was broken 211 hrs. | ○ |
| 5 | Embodiment | Forging | 34 | No problem after passage of 250 hrs. | ◎ |
| 6 | Embodiment | Forging | 41 | No problem after passage on 250 hrs. | ◎ |
| 7 | Conventional Example | Forging | 53 | No problem after passage of 250 hrs. | ◎ |
| 8 | Conventional Example | Forging | 51 | No problem after passage of 250 hrs. | ◎ |

As can be seen obviously from Table 3, the disks (No. 3 to No. 8) according to the invention are greatly improved in the durability of the inside diameter surface on the small diameter end portion side thereof when compared with the conventional disks (No. 1 and No. 2).

Also, out of the disks according to the invention, in the disks in which the high-density nonmetallic inclusions exist in the inside diameter surface over the $((B/A) \times 100\%)$ area of more than 33%, nothing wrong was found in the small diameter end portion side inside diameter surface thereof even after the passage of 250 hrs., which shows that these disks are most excellent in durability.

As can be clearly understood from the foregoing description according to the invention, there can be provided a toroidal type continuously variable transmission disk which not only permits the reduction of the production cost thereof but also can extend the life thereof.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller frictionally engageable with the respective traction surfaces of the input disk and the output disk to thereby transmit power, wherein said disk is used as one of the input disk and the output disk, and said disk comprising metal flows existing along a part of all surfaces of said disk at least including the traction surface, wherein said metal flows have such a positional relationship with respect to the surface of said disk that an angle θ formed between said metal flow existing along the surface and a tangent of the surface is *greater than or equal to 2 degrees and* smaller than or equal to 30 degrees.

2. A disk for use in a toroidal type continuously variable transmission according to claim 1, wherein said metal flows along the surface exist along the traction surface in a range of an angle α of at least 45 degrees or more in a peripheral direction of the traction surface, where the angle α is an angle formed by the traction surface with respect to a horizontal line passing through a center of a radius of the traction surface and parallel to an axis of the disk in a cross section of the disk.

3. A disk for use in a toroidal type continuously variable transmission according to claim 1, wherein said all surfaces of said disk has an inside diameter surface, and said metal flows exist along said inside diameter surface in a distance of h which is a distance from an end surface on the small diameter end portion, and if a length of said disk in an axial direction thereof is expressed as A, the following relationship is achieved: $h \geqq \frac{1}{3} A$.

4. A disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller [fictionally] *frictionally* engageable with the respective traction surfaces of the input disk and the output disk to thereby transmit power, wherein said disk is used as one of the input disk and the output disk, and said disk comprising high-density non metallic inclusions, wherein a small radius of a contact ellipse between the traction surface and the power roller is expressed as b when the power roller is set horizontal so as to be parallel an axis of said disk, and said high-density nonmetallic inclusions do not exist in an area which is distant at least by 1.5 b or shorter in a depth direction from the traction surface.

5. A disk for use in a toroidal type continuously variable transmission [which comprises an input disk and an output disk each including a traction surface of a concave-arc-shaped cross section interposed between a small diameter end portion and a large diameter end portion and disposed concentrically with each other with their respective traction surfaces opposed to each other, and a power roller frictionally engageable with the respective traction surfaces of the input disk and the output disk to thereby transmit power, wherein said disk is used as one of the input disk and the output disk, and] *according to claim 3,*

*wherein* said disk [comprising] *comprises* high-density non metallic inclusions and wherein said high-density non metallic inclusions do not exist in an area in a range of *the distance* h [which is a distance from an end surface on the small diameter end portion, and if a length of said disk in an axial direction thereof is expressed as A, the following relationship is achieved: $h \leqq \frac{1}{3} A$].

6. A method for manufacturing a disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller frictionally engageable with the respective traction surfaces of the input disk and the output disk to thereby transmit power, wherein said disk is used as one of the input disk and the output disk, said manufacturing method comprising the steps of:

preparing a first cylindrical-shaped material with metal flows existing on cross sections of said first material and extending along an axial direction thereof;

preparing a first upper mold comprising:

a plane portion perpendicular to an axis of the first material;

a circular projecting portion being projected from the plane portion, having a diameter smaller than a diameter of the first material and being concentrical with the first material; and a curve molding surface connecting the plane portion and the circular projecting portion;

preparing a first lower mold comprising:

a plane portion perpendicular to the axis of the first material; and a recessed portion formed in the plane portion, being concentrical with the first material so that the first material being fitted into the recessed portion;

swaging the first material in the axial direction thereof with the first upper mold and the first lower mold so as to obtain a second material;

preparing a second lower mold comprising:

a plane portion perpendicular to an axis of the second material;

a projecting portion being projected from a center of the plane portion and being concentrical with the second material; and an inclined portion located outside of the plane portion and inclined obliquely and upwardly;

preparing a second upper mold comprising:

a plane portion perpendicular to the axis of the second material; and a first middle mold projected concentrically with the second material and being formed in a substantially conical shaped;

molding the second material in an axial direction thereof with the second upper mold and the second lower mold so as to obtain a third material;

preparing a third lower mold comprising:

a large diameter end portion molding surface perpendicular to an axis of the third material for molding the large diameter end portion of the disk;

a projecting portion being projected from a center of the large diameter end portion molding surface and being concentrical with the third material; and an outer mold for regulating a diameter the large diameter end portion of the disk;

preparing a third upper mold comprising:

a small diameter end portion molding surface perpendicular to the axis of the third material for molding the small diameter end portion of the disk;

a traction surface molding surface located outside of the small diameter end portion molding surface for molding the traction surface of the concave-arc-shaped cross section; and a second middle mold located at a center of the small diameter end portion molding surface and being concentrical with the third material for molding a part of an inside diameter surface of the disk; and molding the third material in an axial direction thereof with the third upper mold and the third lower mold so as to obtain a fourth material from which a raw disk to finish the disk is obtained.

7. A method for manufacturing a disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller frictionally engageable with the respective traction surfaces of the input disk and the output disk to thereby transmit power, wherein said disk is used as one of the input disk and the output disk, said manufacturing method comprising the steps of:

preparing a first cylindrical-shaped material with metal flows existing on cross sections of said first material and extending along an axial direction thereof;

preparing a first upper mold comprising:

a plane portion perpendicular to an axis of the first material; and a recessed portion formed in a center of the plane portion, a lower end portion of the first material being fitted into the recessed portion;

preparing a first upper mold comprising:

a flat surface perpendicular to the axis of the first material;

a tapered recessed portion located outside of the flat surface, the tapered recessed portion decreasing in diameter in an upward direction and being concentrical with the recessed portion of the first lower mold;

swaging the first material in the axial direction thereof with the first upper mold and the first lower mold so as to obtain a second material;

preparing a second lower mold comprising:

a large diameter end portion molding surface perpendicular to an axis of the second material for molding the large diameter end portion of the disk;

a recessed portion formed at a center of the large diameter end portion molding surface and being concentrical with the second material, a lower end portion of the second material being fitted into the recessed portion; and an outer portion located outside of the large diameter end portion molding surface, being concentrical with the second material and having a diameter for regulating a diameter of the large diameter end portion;

preparing an outer mold comprising:

a small diameter end portion molding surface perpendicular to the axis of the second material for molding the small diameter end portion of the disk;

a traction surface molding surface located outside of the small diameter end portion molding surface for molding the traction surface of the concave-arc-shaped cross section; and a second upper mold located at a center of the small diameter end portion molding surface and having a cylindrical shape, the second upper mold having a tapered recessed portion decreasing in diameter in an upward direction and having a diameter larger than a diameter of the second material, and a flat surface formed at a bottom of the tapered recessed portion and having a diameter larger than an area of non-metallic inclusions existing at a center of an upper end of the second material;

molding the second material in an axial direction thereof with the outer mold and the second lower mold so as to obtain a third material from which a raw disk to finish the disk is obtained.

*8. A disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller rollingly engageable with the respective traction surfaces of the input disk and the output disk to thereby transmit power, wherein said disk is used as one of the input disk and the output disk, and*

*said disk comprising metal flows existing along a surface of said disk including at least of part of the traction surface, wherein said metal flows have such a positional relationship with respect to the surface of said disk that an angle θ formed between each of said metal flows existing along the surface and a tangent of the surface is greater than or equal to 2 degrees and smaller than or equal to 30 degrees.*

*9. A disk for use in a toroidal type continuously variable transmission according to claim 8, wherein said metal flows along the surface exist along the traction surface in a range of an angle α of at least 45 degrees or more in a peripheral direction of the traction surface, where the angle α is an angle formed by the traction surface with respect to a horizontal line passing through a center of a radius of the traction surface and parallel to an axis of the disk in a cross section of the disk.*

*10. A disk for use in a toroidal type continuously variable transmission according to claim 8, wherein said surface of said disk further includes an inside diameter surface, and said metal flows exist along said inside diameter surface in a distance of at least h which is a distance starting at an end surface of the small diameter end portion and extending towards an end surface of the large diameter end portion, and if a length of said disk in a axial direction thereof is expressed as A, the following relationship is achieved: h=A/3.*

*11. A disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller rollingly*

*engageable with the respective traction surfaces of the input disk and the output disk to thereby transmit power, wherein said disk is used as one of the input disk and the output disk, and*

*said disk comprising high-density non metallic inclusions,*

*wherein a small radius of a contact ellipse between the traction surface and the power roller is expressed as b when the power roller is set so as to be parallel an axis of said disk, and said high-density nonmetallic inclusions do not exist in an area which is distant at least by 1.5 b or shorter in a depth direction from the traction surface.*

*12. A disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller rollingly engageable with the respective traction surfaces of the input disk and the output disk to thereby transmit power, wherein said disk is used as one of the input disk and the output disk, and*

*said disk comprising metal flows existing along a surface of said disk including at least of part of the traction surface, wherein said metal flows have such a positional relationship with respect to the surface of said disk that an angle θ formed between each of said metal flows existing along the surface and a tangent of the surface is smaller than or equal to 30 degrees, and*

*wherein said metal flows along the surface exist along the traction surface at least in a range of an angle α of at least 45 degrees or more in a peripheral direction of the traction surface, where the angle α is an angle formed by the traction surface with respect to a horizontal line passing through a center of a radius of the traction surface and parallel to an axis of the disk in a cross section of the disk, and*

*said angle θ varies for said metal flows exist along the traction surface at least in said range of said angle α.*

*13. A disk for use in a toroidal type continuously variable transmission according to claim 12, wherein said surface of said disk further includes an inside diameter surface, and said metal flows exist along said inside diameter surface in a distance of at least h which is a distance starting at an end surface of the small diameter end portion and extending towards an end surface of the large diameter end portion, and if a length of said disk in a axial direction thereof is expressed as A, the following relationship is achieved: h=A/3.*

*14. A disk for use in a toroidal type continuously variable transmission according to claim 12, wherein said angle θ is greater than or equal to 2 degrees and smaller than or equal to 30 degrees.*

*15. A disk for use in a toroidal type continuously variable transmission according to claim 14, wherein said angle θ is greater than or equal to 5 degrees and smaller than or equal to 20 degrees.*

*16. A disk for use in a toroidal type continuously variable transmission which comprises an input disk and an output disk each including a traction surface of a concave-arc-shaped cross section interposed between a small diameter end portion and a large diameter end portion and disposed concentrically with each other with their respective traction surfaces opposed to each other, and a power roller rollingly engageable with the respective traction surfaces of the input disk and the output disk to thereby transmit power, wherein said disk is used as one of the input disk and the output disk, and*

*said disk comprising metal flows existing along at least a part of the traction surface of said disk, wherein said metal flows have such a positional relationship with respect to the surface of said disk that an angle θ formed between each of said metal flows existing along the surface and a tangent of the surface is greater than or equal to 2 degrees and smaller than or equal to 30 degrees.*

*17. A disk for use in a toroidal type continuously variable transmission according to claim 15, wherein said angle θ is greater than or equal to 5 degrees and smaller than or equal to 20 degrees.*

*18. A disk for use in a toroidal type continuously variable transmission according to claim 10, wherein said disk comprises high-density non metallic inclusions, and said high-density non metallic inclusions do not exist in an area along said inside diameter surface at least in a range of the distance h.*

* * * * *